(12) United States Patent
Kawasaki et al.

(10) Patent No.: US 11,714,981 B2
(45) Date of Patent: Aug. 1, 2023

(54) INFORMATION PROCESSING SYSTEM AND SLIP CREATION METHOD

(71) Applicants: Hajime Kawasaki, Chiba (JP); Makoto Aoki, Tokyo (JP); Takeshi Ogawa, Kanagawa (JP); Koichi Kudo, Kanagawa (JP)

(72) Inventors: Hajime Kawasaki, Chiba (JP); Makoto Aoki, Tokyo (JP); Takeshi Ogawa, Kanagawa (JP); Koichi Kudo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 11 days.

(21) Appl. No.: 17/236,152

(22) Filed: Apr. 21, 2021

(65) Prior Publication Data

US 2021/0240957 A1 Aug. 5, 2021

Related U.S. Application Data

(63) Continuation of application No. 16/519,165, filed on Jul. 23, 2019, now Pat. No. 11,023,699.

(30) Foreign Application Priority Data

Jul. 30, 2018 (JP) ................................. 2018-142989
Jul. 30, 2018 (JP) ................................. 2018-142990
Jul. 30, 2018 (JP) ................................. 2018-142991
Mar. 15, 2019 (JP) ................................. 2019-049124

(51) Int. Cl.
*G06K 7/14* (2006.01)
(52) U.S. Cl.
CPC ......... *G06K 7/1447* (2013.01); *G06K 7/1443* (2013.01); *G06K 7/1456* (2013.01)

(58) Field of Classification Search
CPC .. G06K 7/1447; G06K 7/1456; G06K 7/1443; G06K 19/06028; G06K 17/00; G06F 3/1282; G06F 3/1203; G06F 3/1275; Y02P 90/30; G06Q 10/06312; G06Q 50/04; H04N 1/387
See application file for complete search history.

(56) References Cited

U.S. PATENT DOCUMENTS 8,991,689 B2   3/2015 Yamauchi
10,068,262 B1*  9/2018 Nidamarthi ........ G06Q 30/0282
10,121,040 B2  11/2018 Katayama et al.
(Continued)

FOREIGN PATENT DOCUMENTS

CN   101350083   1/2009
JP   H11-096254   4/1999
(Continued)

OTHER PUBLICATIONS

Japanese Office Action for 2019-049124 dated Jul. 12, 2022.
(Continued)

*Primary Examiner* — Seung H Lee
(74) *Attorney, Agent, or Firm* — IPUSA, PLLC

(57) ABSTRACT

An information processing system including a circuitry configured to detect first identification information used to identify a job, generate second identification information associated with the first identification information, and create a slip on which the first identification information and the second identification information are displayed.

27 Claims, 27 Drawing Sheets

(56) References Cited

U.S. PATENT DOCUMENTS

| | | |
|---|---|---|
| 2007/0278305 A1 | 12/2007 | Komaki |
| 2008/0141169 A1 | 6/2008 | Sakura et al. |
| 2009/0006579 A1 | 1/2009 | Endo |
| 2009/0024239 A1 | 1/2009 | Yoshioka et al. |
| 2009/0279137 A1 | 11/2009 | Mori |
| 2009/0314838 A1 | 12/2009 | Kimura et al. |
| 2012/0320407 A1 | 12/2012 | Hoarau et al. |
| 2013/0346138 A1 | 12/2013 | Rai |
| 2014/0350708 A1* | 11/2014 | Kobayashi ............. G06Q 10/06 700/108 |
| 2018/0046416 A1 | 2/2018 | Watanabe |

FOREIGN PATENT DOCUMENTS

| | | |
|---|---|---|
| JP | H11-109602 | 4/1999 |
| JP | 2002-137812 | 5/2002 |
| JP | 2005-100298 | 4/2005 |
| JP | 2006-259045 | 9/2006 |
| JP | 2007-226395 | 9/2007 |
| JP | 2007-249658 | 9/2007 |
| JP | 2007-328399 | 12/2007 |
| JP | 2008-59322 | 3/2008 |
| JP | 2010-012667 | 1/2010 |
| JP | 2011-186628 | 9/2011 |
| JP | 2012-3632 | 1/2012 |
| JP | 2014-042148 | 3/2014 |
| JP | 2015-115015 | 6/2015 |
| JP | 2015-225630 | 12/2015 |
| JP | 2017-199300 | 11/2017 |
| JP | 2017-199306 | 11/2017 |

OTHER PUBLICATIONS

Office Action dated Apr. 26, 2022 issued with respect to the basic Japanese Patent Application No. 2018-142991.
Japanese Office Action for 2018-142990 dated Jan. 11, 2022.
The partial European Search Report for 19185776.2 dated Nov. 29, 2019.
Extended European Search Report for 19185776.2 dated Feb. 21, 2020.
Summons to attend oral proceedings for 19185776.2 mailed on Nov. 29, 2022.
Japanese Office Action for 2019-049124 dated Nov. 22, 2022.
Decision of rejection dated Apr. 18, 2023 issued with respect to the basic Japanese Patent Application No. 2019-049124.
First Office Action dated Mar. 31, 2023 issued with respect to the corresponding Chinese Patent Application No. 201910683804.9 with English Translation.

* cited by examiner

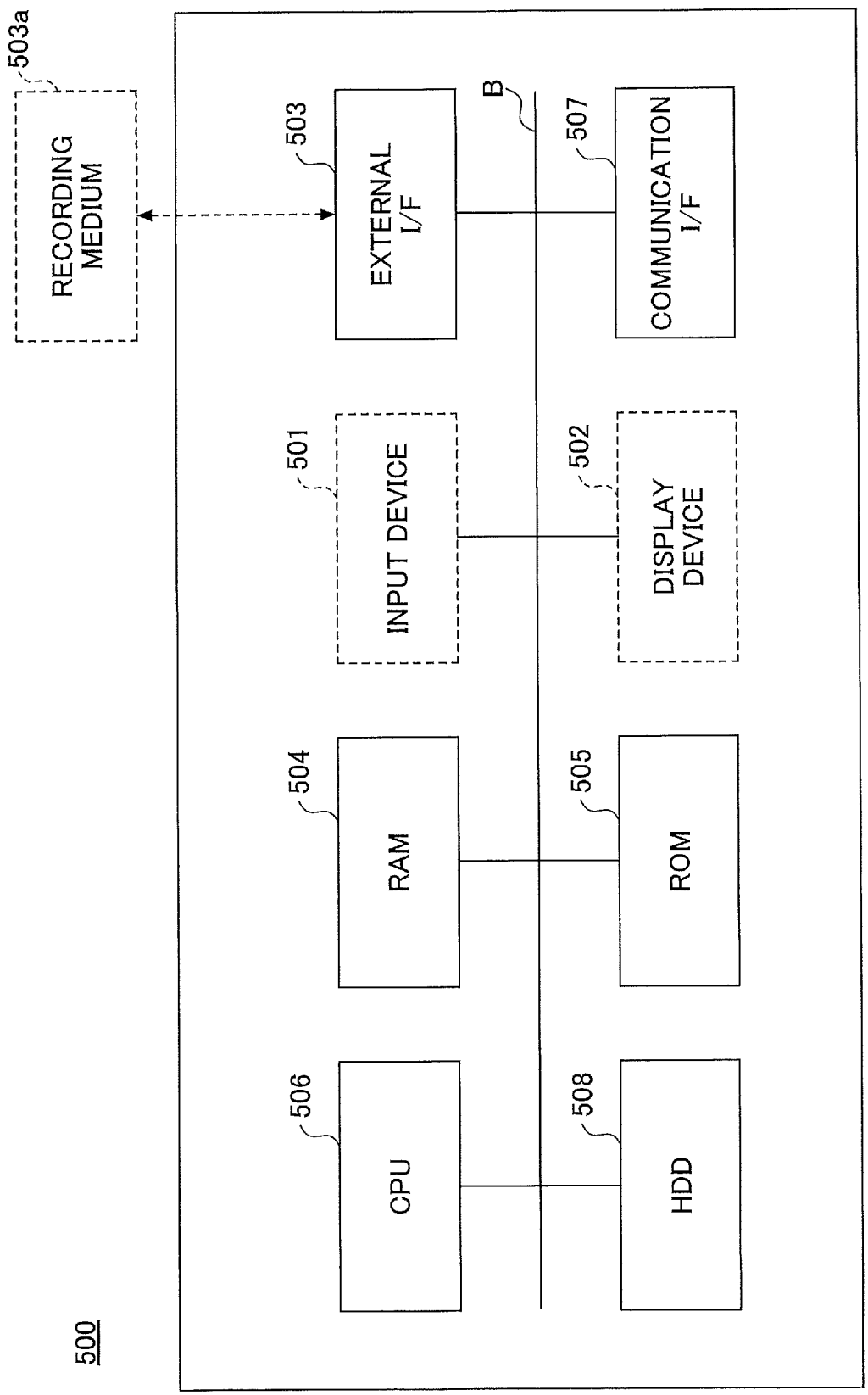

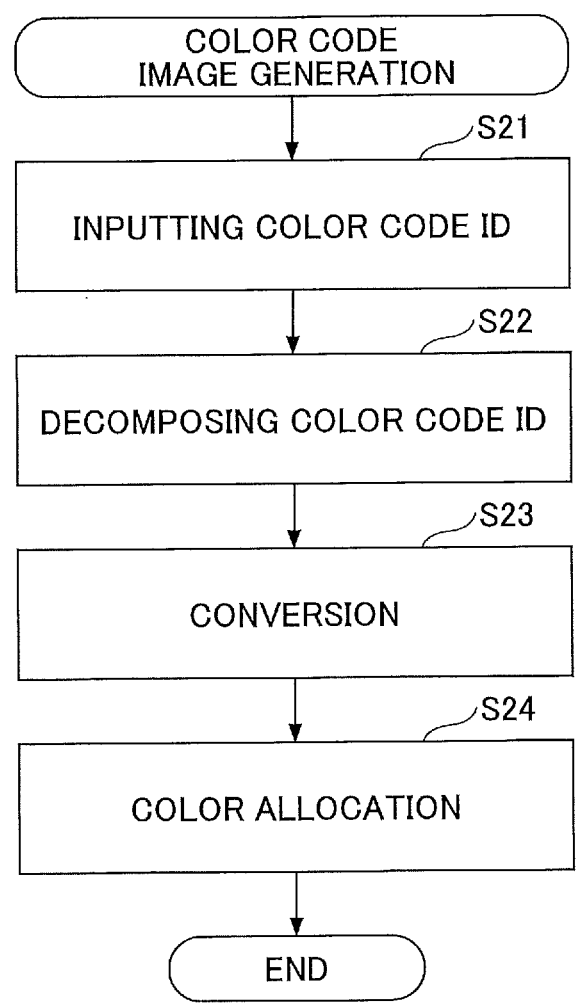

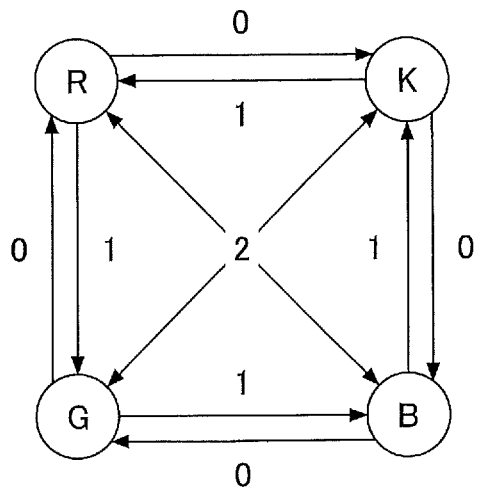
FIG.8A
FIG.8B
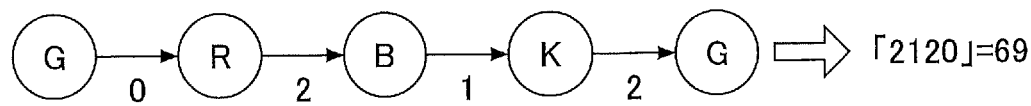
「2120」=69
FIG.8C
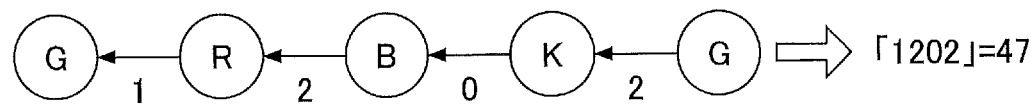
「1202」=47
FIG.8D
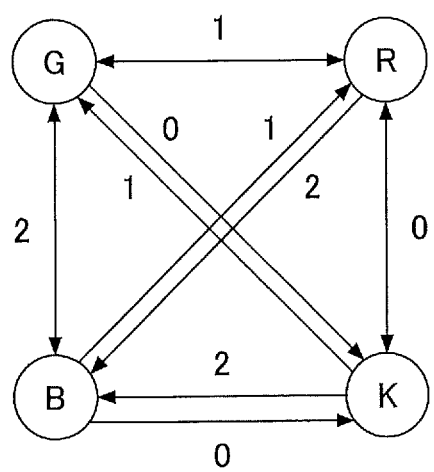
FIG.8E
| | 0 | 1 | 2 |
|---|---|---|---|
| R | K | G | B |
| G | K | R | B |
| B | K | R | G |
| K | R | G | B |

FIG.24A

| JOB ID | COLOR CODE ID ▶ | JOB NAME ▶ | FINAL UPDATE ▶ | PRINTING | CUTTING | TEMPORARY STORAGE 1 | FOLDING | BINDING | TEMPORARY STORAGE 2 | IN-SPECTING |
|---|---|---|---|---|---|---|---|---|---|---|
| 00000001 | (Null) | Test_01 | 2018/3/10 10:23:40 | ● | ● | ● | ● | ○ | ● | ○ |
| 00000002 | 0002 | test_02 | 2018/3/10 10:23:40 | ● | ○ | ◎ | ● | ○ | ○ | ○ |
| 00000003 | 0003 | test_03 | 2018/3/10 14:45:20 | ○ | ○ | ○ | ○ | ● | ○ | × |

FIG.24B

| JOB ID | COLOR CODE ID ▶ | JOB NAME ▶ | FINAL UPDATE ▶ | FIRST FLOOR AREA | | | SECOND FLOOR AREA | | | IN-SPECTING |
|---|---|---|---|---|---|---|---|---|---|---|
| | | | | PRINTING | CUTTING | TEMPORARY STORAGE 1 | FOLDING | BINDING | TEMPORARY STORAGE 2 | |
| 00000001 | (Null) | Test_01 | 2018/3/10 10:23:40 | ● | ● | ● | ● | ○ | ● | ○ |
| 00000002 | 0002 | test_02 | 2018/3/10 10:23:40 | ● | ○ | ◎ | ● | ○ | ○ | ○ |
| 00000003 | 0003 | test_03 | 2018/3/10 14:45:20 | ○ | ○ | ○ | ○ | ● | ○ | × |

FIG.24C

| JOB ID | COLOR CODE ID ▶ | JOB NAME ▶ | FINAL UPDATE ▶ | FIRST FLOOR AREA ⊞ | SECOND FLOOR AREA ⊟ | | | IN-SPECTING |
|---|---|---|---|---|---|---|---|---|
| | | | | | FOLDING | BINDING | TEMPORARY STORAGE 2 | |
| 00000001 | (Null) | Test_01 | 2018/3/10 10:23:40 | ● | ● | ○ | ● | ○ |
| 00000002 | 0002 | test_02 | 2018/3/10 10:23:40 | ◎ | ● | ○ | ○ | ○ |
| 00000003 | 0003 | test_03 | 2018/3/10 14:45:20 | ○ | ○ | ● | ○ | × |

FIG.25A

| JOB ID ▶ | COLOR CODE ID ▶ | JOB NAME ▶ | FINAL UPDATE ▶ | PRINTING | CUTTING | TEMPORARY STORAGE 1 | FOLDING | BINDING | TEMPORARY STORAGE 2 | IN-SPECTING | SATISFYING CONDITION |
|---|---|---|---|---|---|---|---|---|---|---|---|
| | | Test_ | | | | | ● | | | | |
| 00000001 | (Null) | Test_01 | 2018/3/10 10:23:40 | ● | ● | ● | ● | ○ | ● | ○ | ○ |
| 00000002 | 0002 | test_02 | 2018/3/10 10:23:40 | ● | ○ | ◎ | ● | ○ | ○ | ○ | ○ |

FIG.25B

| JOB ID ▶ | COLOR CODE ID ▶ | JOB NAME ▶ | FINAL UPDATE ▶ | PRINTING | CUTTING | TEMPORARY STORAGE 1 | FOLDING | BINDING | TEMPORARY STORAGE 2 | IN-SPECTING | SATISFYING CONDITION |
|---|---|---|---|---|---|---|---|---|---|---|---|
| | | Test_ | | | | ◎ / △ / × / ◎ / ● / ○ | ● | | | | |
| 00000001 | (Null) | Test_01 | 2018/3/10 10:23:40 | ● | ● | ● | ● | ○ | ● | ○ | ○ |
| 00000002 | 0002 | test_02 | 2018/3/10 10:23:40 | ● | ○ | | ● | ○ | ○ | ○ | ○ |

FIG.25C

| JOB ID ▶ | COLOR CODE ID ▶ | JOB NAME ▶ | FINAL UPDATE ▶ | PRINTING | CUTTING | TEMPORARY STORAGE 1 | FOLDING | BINDING | TEMPORARY STORAGE 2 | IN-SPECTING | SATISFYING CONDITION |
|---|---|---|---|---|---|---|---|---|---|---|---|
| | | Test_ | FROM 2018/3/10 10:00:00 TO : 2018/3/10 11:00:00 | | | | ● | | | | |
| 00000001 | (Null) | Test_01 | 2018/3/10 10:23:40 | ● | ● | ● | ● | ○ | ● | ○ | ○ |
| 00000002 | 0002 | test_02 | 2018/3/10 10:23:40 | ● | ○ | ◎ | ● | ○ | ○ | ○ | ○ |

INFORMATION PROCESSING SYSTEM AND SLIP CREATION METHOD

CROSS-REFERENCE TO RELATED APPLICATIONS

This application is a continuation application filed under 35 U.S.C. 111(a) claiming the benefit under 35 U.S.C. 120 of U.S. patent application Ser. No. 16/519,165 filed on Jul. 23, 2019, which is based upon and claims priority to Japanese Patent Application Nos. 2018-142989, 2018-142990, and 2018-142991, each filed on Jul. 30, 2018 and Japanese Patent Application No. 2019-49124, filed on Mar. 15, 2019, the entire contents of which are incorporated herein by reference.

BACKGROUND OF THE INVENTION

Field of the Invention

The present invention relates to an information processing system, a cooperative management method, a program, and a medium.

Description of the Related Art

It has been conventionally performed to manage the progress of a job composed of a plurality of work processes by utilizing a bar code or the like printed on a work instruction.

In addition, a system for controlling the operator's working time and the flow of the object (entry and exit of the worksite) by applying RFID tags to the object to be worked with the worker (materials, work in process, products, etc.) and reading the RFID tags at the entrance gate of the processing site and at the exit gate of the processing site has been known (see, for example, Patent Document 1).

In the case of forming an image of a code symbol on a paper, it is conventionally known that if the reduction layout is performed by using the reduction layout function, there is a possibility that information cannot be read from the code symbol due to the reduction of the image.

For this reason, when a plurality of pages of an original including code symbols are to be laid out in a reduced layout, the following method has been proposed. At first, a code region in which code symbols are arranged in a predetermined size equal to or larger than a readable minimum size in the code system of the code symbols is secured, and then code symbols are arranged in the code region in the predetermined size (see, for example, Patent Document 2).

It has been conventionally performed to manage the progress of a job composed of a plurality of work processes by utilizing a bar code or the like printed on a work instruction.

In addition, a system for controlling the operator's working time and the flow of the object (entry and exit of the worksite) by applying RFID tags to the object to be worked with the worker (materials, work in process, products, etc.) and reading the RFID tags at the entrance gate of the processing site and at the exit gate of the processing site has been known (see, for example, Patent Document 1).

BACKGROUND ART

[Patent Document 1] Japanese Laid-Open Patent Application No. 2005-100298

[Patent Document 2] Japanese Laid-Open Patent Application No. 2014-42148

SUMMARY OF THE INVENTION

In an existing system that manages the progress of a job composed of a plurality of work processes by using a bar code or the like printed on a work instruction, a user may want to add a new function while leaving the function (function of the work instruction) realized by using the work instruction. However, it has not been easy to add a new function to the work instruction while minimizing a change to the existing system.

An object of the present invention is to provide an information processing system capable of easily adding a function realized by a slip.

Further, the existing system uses a code image such as a bar code printed on the slip such as a work instruction. A user using such an existing system may wish to add a new code image. However, if the slip image is simply reduced, there is a possibility that the code image printed on the slip cannot be read (cannot be recognized).

Another object of the present invention is to provide the information processing system capable of reducing a code image while a first slip image displayed on the code image is in a readable state and creating a second slip image on which a new code image is displayed.

In the conventional existing system in which the progress of the job composed of a plurality of work processes is managed by using the bar code or the like printed on the work instruction, there has been a problem that it is difficult for the user to confirm the progress of each job.

Another object of the present invention is to provide the information processing system in which the user can easily confirm information on progress of the plurality of jobs composed of the plurality of work processes.

SUMMARY OF THE INVENTION

In order to achieve the above object, this disclosure provides an information processing system including a circuitry configured to detect first identification information used to identify a job, generate second identification information associated with the first identification information, and create a slip on which the first identification information and the second identification information are displayed.

BRIEF DESCRIPTION OF THE DRAWINGS

FIG. 3 illustrates a hardware configuration diagram of an example of a computer.

FIG. 7 is a flowchart of an example of a process for generating a color code image.

FIGS. 8A-8E are diagrams for explaining a coding rule capable of expressing a ternary number.

FIGS. 24A-24C explain examples of grouping processing on the UI screen.

FIGS. 25A-25C explain examples of search condition designation processing on the UI screen.

DETAILED DESCRIPTION OF THE EMBODIMENT

Embodiments of the present invention will be described below with reference to the drawings. In the embodiments, a job management system will be described as an example in which management of a work process of a job in a printing factory is realized by a function (function of a work instruction) using a work instruction (slip). The work instruction includes a so-called "job ticket" in the field of printing technology.

First Embodiment

<Systems Configuration>

Figure 1:
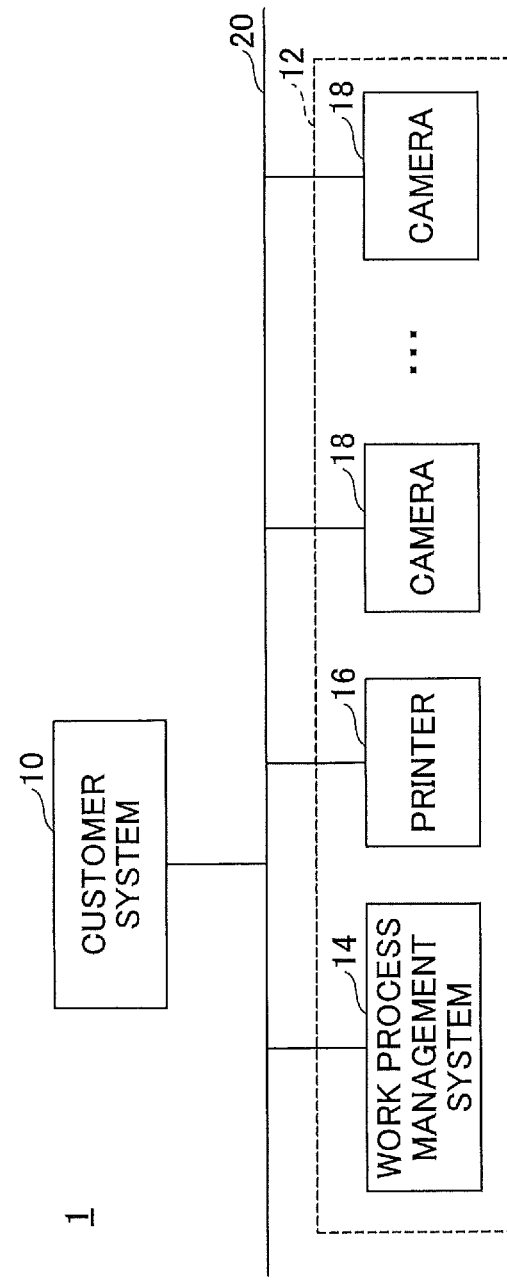
FIG. 1 is a block diagram of an example of a job management system according to the present embodiment.

FIG. 1 illustrates an example of the configuration of the job management system according to the present embodiment. FIG. 2 illustrates an example of a work instruction used in the job management system according to the present embodiment. In the job management system 1 of FIG. 1, a customer system 10, a work process management system 14, a printer 16, and one or more cameras 18 are connected via a network 20 such as the Internet or a LAN so as to be able to perform data communications.

Figures 2A, 2B:
FIGS. 2A and 2B are image diagram of an example of a work instruction used in the job management system according to the present embodiment.

The customer system 10 is an example of an existing system used by a customer, and creates a work instruction 800 for the customer system 10 illustrated in FIG. 2A in which a job ID is displayed. The job ID is an example of identification information for identifying a job. In the work instruction 800 for the customer system 10, at least one bar code image 801 used by the customer system 10 is displayed.

The job ID may be displayed in the work instruction 800 for the customer system 10 with the bar code image 801, or may be displayed in text. The customer system 10 provides users with existing functions implemented by work instructions 800 for the customer system 10.

The work process management system 14, the printer 16, and the one or more cameras 18 constitute the information processing system 12 that adds a new function to the work instruction 800. The work process management system 14 manages the progress of a job composed of a plurality of work processes as described later using a work instruction 810 for the information processing system 12 to which the color code image 811 of FIG. 2B is added. The information processing system 12 can specify the job ID from the color code image 811 as described later.

The printer 16 prints the work instruction 810 for the information processing system 12. The camera 18 is installed in the printing factory so as to be able to photograph a place corresponding to the job process in the printing factory. The location corresponding to the work process of the job is, for example, a location where the printed matter passes by the movement between the work processes, a temporary storage location where the printed matter is temporarily stored, or the like.

The camera 18 can be a PTZ camera or an IP camera. The PTZ camera is a camera capable of operation a PTZ (Pan Tilt Zoom) function via the network 20, and capable of transmitting a photographed image or a photographed moving image via the network 20. The IP camera is a camera that can be operated via the network 20, and can transmit a photographed image or a photographed moving image via the network 20. The photographed image and the photographed moving image photographed by the camera 18 are transmitted to the work process management system 14 via the network 20.

In the information processing system 12 that adds a new function to the work instruction 800, the work instruction 810 for the information processing system 12 is attached to a printed matter that is an example of an intermediate product or a material of a job corresponding to the work instruction 810. The work instruction 810 is attached to a printed matter that is easily photographed by the camera 18, for example.

The work process management system 14 manages the progress (job state) of the work process of the job based on the work process of the job corresponding to the camera 18 that photographed the work instruction 810 and the job ID specified from the color code image 811 of the work instruction 810. Further, the work process management system 14 manages a history of the work process of the job and a photographed image or a photographed moving image representing the state of photographing the work instruction 810.

The configuration of the job management system 1 illustrated in FIG. 1 is an example. For example, the job management system 1 may include another system, or the work process management system 14 may have a different name. The work process management system 14 may be realized in one server environment or a plurality of server environments.

<Hardware Configuration>

The customer system 10 and the work process management system 14 are realized by, for example, a computer 500 having a hardware configuration illustrated in FIG. 3.

FIG. 3 is a hardware configuration diagram of an example of a computer. The computer 500 of FIG. 3 includes an input device 501, a display device 502, an external I/F 503, a RAM 504, a ROM 505, a CPU 506, a communication I/F 507, a HDD 508, and the like, which are connected to each other via a bus B. The input device 501 and the display device 502 may be connected and used when necessary.

The input device 501 includes a keyboard, a mouse, a touch panel, and the like, and is used by a user to input operation signals. The display device 502 includes a display or the like, and displays a result of processing by the computer 500.

The communication I/F 507 is an interface for connecting the computer 500 to various networks. As a result, the computer 500 can perform data communications via the communication I/F 507.

The HDD 508 is an example of a nonvolatile memory device that stores programs and data. The stored programs and data include an OS which is basic software for controlling the entire computer 500, application software for providing various functions on the OS, and the like. The computer 500 may use a drive device (for example, a solid state drive (SSD)) using a flash memory as a memory medium instead of a HDD 508.

The external I/F 503 is an interface with an external device. The external apparatus includes a recording medium 503a and the like. As a result, the computer 500 can read and/or write the recording medium 503a via the external I/F 503. The recording medium 503a includes a flexible disk, a CD, a DVD, an SD memory card, a USB memory, and the like.

The ROM 505 is an example of a nonvolatile semiconductor memory (storage device) that can hold programs and data even when the power is turned off. The ROM 505 stores programs and data such as BIOS, operating system settings, and network settings that are executed when the computer 500 is activated. The RAM 504 is an exemplary volatile semiconductor memory (storage device) that temporarily stores programs and data.

The CPU 506 is an arithmetic unit which realizes control and functions of the entire computer 500 by reading programs and data from a storage device such as a ROM 505 and a HDD 508 on a RAM 504 and executing processes. The customer system 10 and the work process management system 14 can realize various types of processing described later by the hardware configuration of the computer 500 as illustrated in FIG. 3, for example. The hardware configurations of the printer 16 and the camera 18 will not be described.

<Software Configuration>

Figure 4:
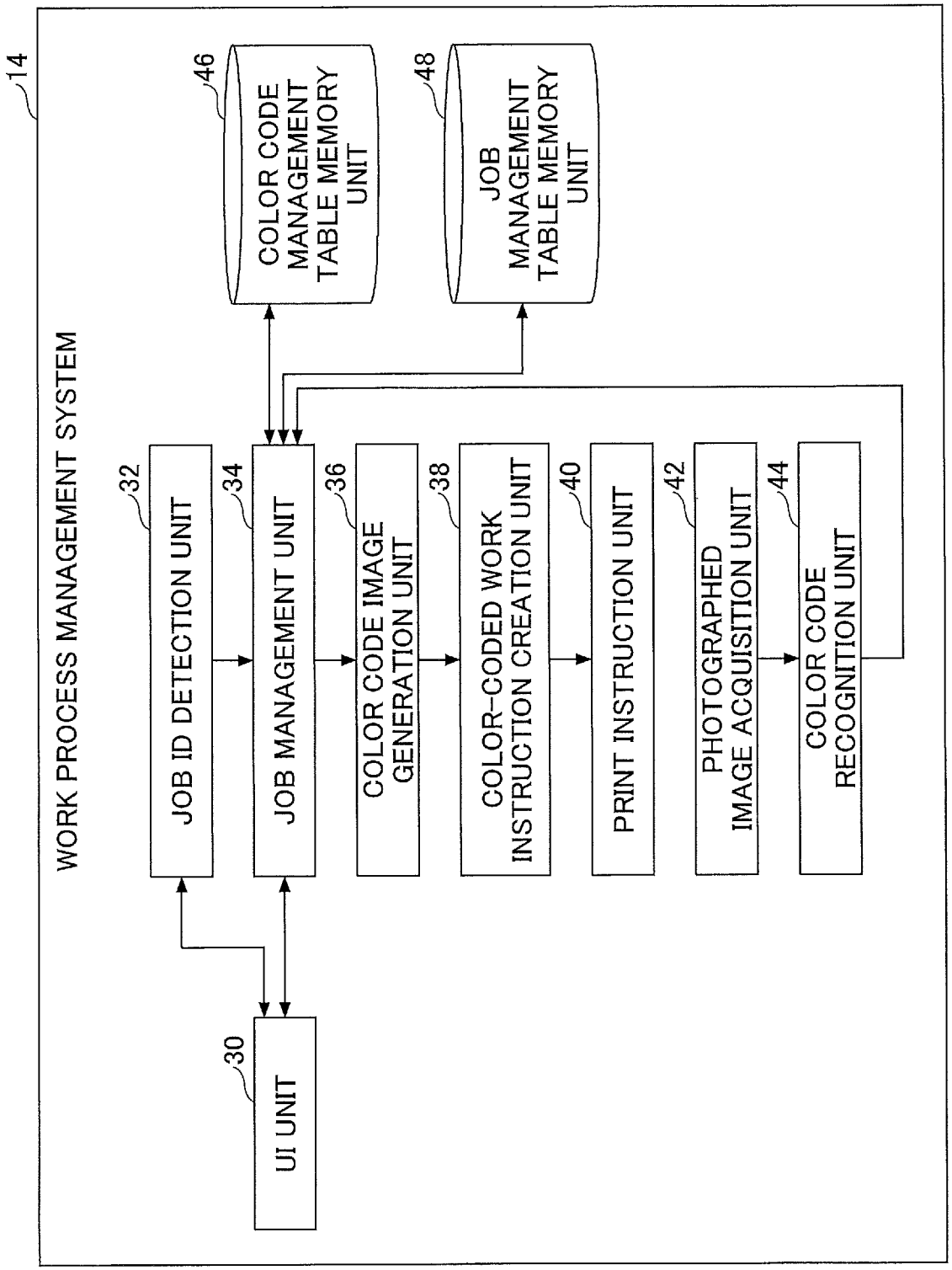
FIG. 4 is a functional block diagram of an example of a work process management system.

FIG. 4 is a functional configuration diagram of an example of the work process management system. Incidentally, the functional configuration of FIG. 4 is omitted as appropriate for the configuration unnecessary for the description of the present embodiment. The work process management system 14 of FIG. 4 includes a UI unit 30, a job ID detection unit 32, a job management unit 34, a color code image generation unit 36, a color-coded work instruction creation unit 38, a print instruction unit 40, a photographed image acquisition unit 42, a color code recognition unit 44, a color code management table memory unit 46, and a job management table memory unit 48.

The CPU 506 illustrated in FIG. 3 implements a program stored in, for example, the ROM 505 to function as the UI unit 30. The UI unit 30 controls the display of various screens, such as a screen that receives various necessary settings from a user, a job status list screen, a job detail history screen, a dashboard display screen, and a motion line display screen, which will be described later. The CPU 506 illustrated in FIG. 3 implements a program stored in, for example, the ROM 505 to function as the job ID detecting unit 32. The job ID detecting unit 32 detects a job ID displayed in a bar code image 801 or text in a work instruction 800 for the customer system 10 illustrated in FIG. 2A, for example. For example, information, such as the bar code image 801 or text in the work instruction 800, captured by the camera 18 is received by the job ID detecting unit 32, and the job ID detecting unit 32 detects the job ID from the received information.

The CPU 506 illustrated in FIG. 3 implements a program stored in, for example, the ROM 505 to function as the job management unit 34. The ROM 505 or HDD 508 illustrated in FIG. 3 functions as the color code management table memory unit 46. The job management unit 34 memories and manages the available color code ID in the color code management table memory unit 46. The job management unit 34 limits the number of available color code IDs and narrows the range of values necessary for expressing the color code IDs, thereby maximizing the size of the color code image 811 and facilitating color code recognition to be described later.

If the color code ID that is not used remains in the color code management table memory unit 46, the job management unit 34 selects the color code ID of the old last update from the color code management table memory unit 46 and reuses the selected color code ID. The job management unit 34 manages the job ID detected by the job ID detection unit 32 and the selected color code ID in association with each other in the color code management table memory unit 46.

Further, the job management unit 34 memories and manages job information corresponding to the job ID and the color code ID in the job management table memory unit 48. The job management table memory unit 48 manages progress information and history information of a work process of a job, a photographed image file and a photographed moving image file representing a state of photographing the work instruction 810, and is used to display a job status list screen and the like, which will be described later.

The CPU 506 illustrated in FIG. 3 implements a program stored in, for example, the ROM 505 to function as the color code image generation unit 36. The color code image generation unit 36 generates a color code image 811, which will be described later, from the color code ID provided from the job management unit 34. The CPU 506 illustrated in FIG. 3 implements a program stored in, for example, the ROM 505 to function as the color-coded work instruction creation unit 38. The color-coded work instruction creation unit 38 creates data of a work instruction 810 for the information processing system 12 to which the color code image 811 of FIG. 2B is added from the work instruction 800 for the customer system 10 of FIG. 2A. The data created by the color-coded work instruction creation unit 38 is to be printed by, for example, the printer 16. The print instruction unit 40 instructs the printer 16 to print the work instruction 810 for the information processing system 12 to which the color code image 811 of FIG. 2B is added.

The CPU 506 illustrated in FIG. 3 implements a program stored in, for example, the ROM 505 to function as the photographed image acquisition unit 42. The photographed image acquisition unit 42 acquires a photographed image and a photographed moving image from the camera 18. The CPU 506 illustrated in FIG. 3 implements a program stored in, for example, the ROM 505 to function as the color code recognition unit 44. The color code recognition unit 44 decodes the color code ID from the color code image 811 that has been photographed in the photographed image or the photographed moving image. The color code recognition unit 44 provides the job management unit 34 with, for example, identification information for identifying the working process of the camera 18 or the job that photographed the color code image 811, and the decoded color code ID. The job management unit 34 identifies the job ID corresponding to the decoded color code ID with reference to the job management table memory unit 48.

The ROM 505 or HDD 508 illustrated in FIG. 3 functions as the color code management table memory unit 46. As a result, the job management unit 34 can update the progress information (job status) of the job work process managed by the job management table memory unit 48 based on the job work process corresponding to the camera 18 that photographed the color code image 811 and the job ID corresponding to the decoded color code ID.

<Processing>

Figure 5:
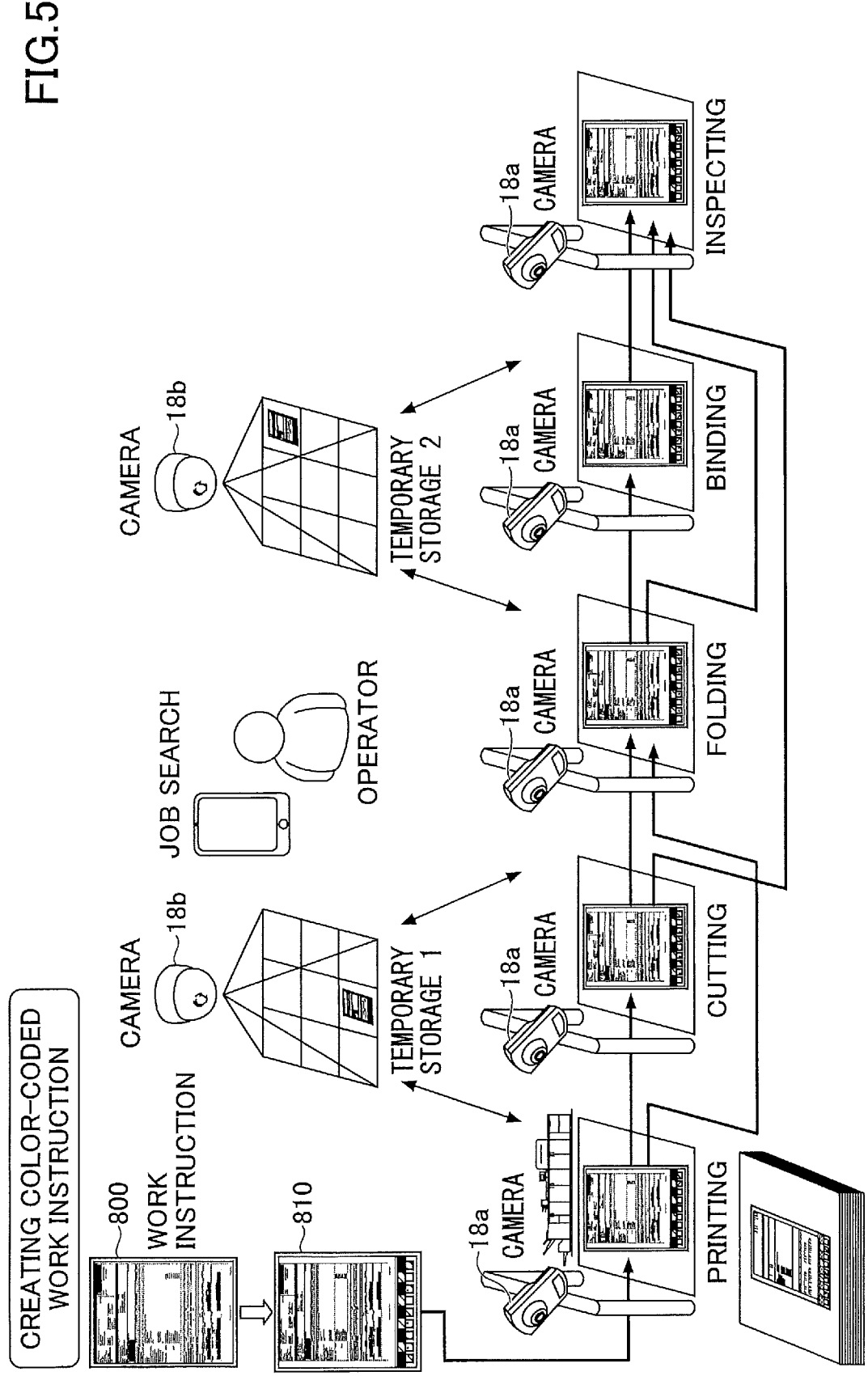
FIG. 5 is an image diagram showing an example of a job working process in a printing factory.

FIG. 5 is an image diagram showing an example of a job working process in a printing factory. The process of FIG. 5 includes "printing", "cutting", "folding", "binding", "inspection", "temporary storage 1", and "temporary storage 2". The camera 18a is installed at a gate in front of a place where the work processes "printing", "cutting", "folding", "binding" and "inspection" are performed. The camera 18b is installed in a place where the work process "temporary storage 1" and "temporary storage 2" are performed.

The work instruction 810 for the information processing system 12 is photographed by the camera 18a or the camera 18b while moving between work processes or being stored in a temporary storage location. Note that, as illustrated in FIG. 5, in the printing factory, the movement between the work processes is not certain, and the work instruction 810 for the information processing system 12 is not photographed by the job, and the work process in which detection and recording are not performed may be included. In FIG. 5, arrows representing the movement of jobs for performing all the work processes and arrows representing the movement of jobs for skipping a part of the work processes are illustrated.

In FIG. 5, after a printed matter is output by the work process "printing", a work instruction 810 is attached to the printed matter. As a result, in the example of FIG. 5, the work instruction 810 attached to the printed matter is photographed by the camera 18a or the camera 18b while the printed matter passes through the gate or is stored in the temporary storage location.

<Creation of Color Coded Work Instructions>>

Figure 6:
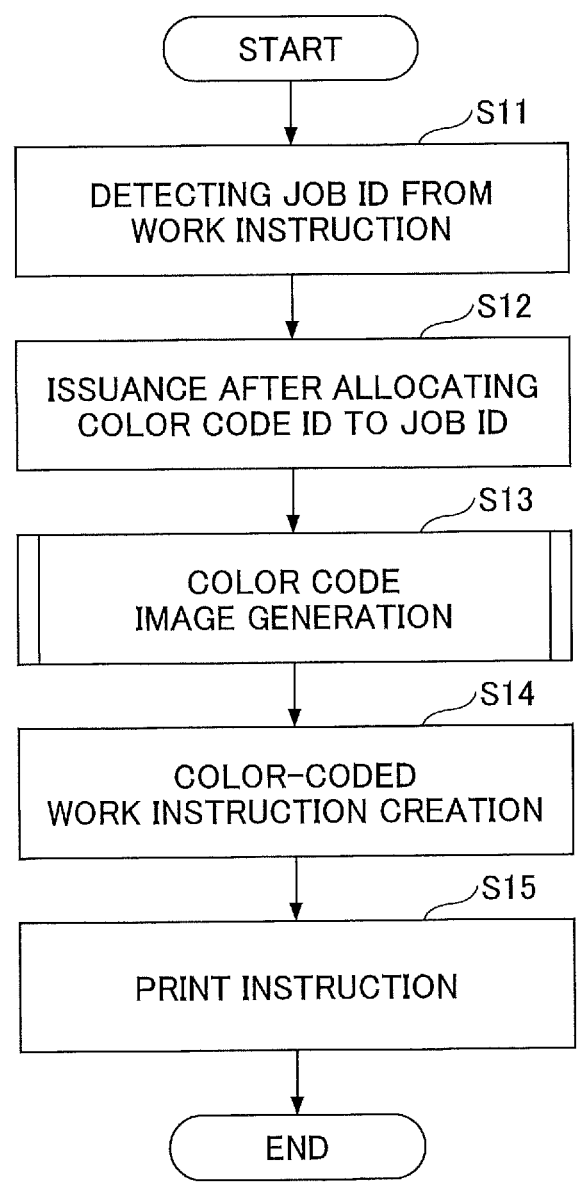
FIG. 6 is a flowchart of an example of a process for creating a work instruction with color code.

FIG. 6 is a flowchart of an example of processing for creating a work instruction with a color code. In step S11, the job ID detection unit 32 of the work process management system 14 detects the job ID displayed in the work instruction 800 for the customer system 10 by the bar code image 801 or the text. The detection frame for detecting the job ID from the work instruction 800 may be set in advance by the operator, or may be automatically set by using OCR or the like.

In step S12, the job management unit 34 selects the color code ID to be used from the color code management table memory unit 46, and manages the selected color code ID in association with the job ID detected by the job ID detection unit 32.

In step S13, the color code image generation unit 36 generates a color code image 811 from the color code ID associated with the job ID in the procedure illustrated in FIG. 7. The procedure illustrated in FIG. 7 uses, for example, the technique described in Japanese Laid-Open Patent Application No. 2017-199306.

FIG. 7 is a flowchart of an example of processing for generating a color code image. In step S21, the color code image generation unit 36 receives an input of a color code ID to be color coded. In step S22, the color code image generation unit 36 decomposes the character string of the color code ID into the values of the digits. In step S23, the color code image generation unit 36 converts the value of each separated digit into a value corresponding to the number of colors to be assigned to each cell of the optical symbol described in Japanese Laid-Open Patent Application No. 2017-199306. For example, if the number of colors assigned to each cell is four, the color code image generation unit 36 converts the value of each digit into a value of a ternary number according to a coding rule as illustrated in FIG. 8, for example.

FIG. 8 explains a coding rule capable of expressing a ternary number. FIG. 8 shows an example of the coding rule when four colors of red color (hereinafter, referred to as "R"), green color (hereinafter, referred to as "G"), blue color (hereinafter, referred to as "B"), and black color (hereinafter, referred to as "K") are used. In the case of using four colors, it is possible to express them in three values, that is, in a ternary number.

For example, as illustrated in FIG. 8A, each transition from R to K, from K to B, from B to G, and from G to R represents a value "0". In addition, each transition from R to G, G to B, B to K, and K to R in the counterclockwise direction represents a value "1". Furthermore, bi-directional transitions along the diagonals, i.e. between R and B, and between K and G, respectively, represent the value "2".

For example, referring to FIG. 8B, a case where color transition of each cell is observed from left to right in a cell column connected in order of G, R, B, K, and G is considered. In this case, the transition from G to R represents the value "0", the transition from R to B represents the value "2", the transition from B to K represents the value "1", and the transition from K to G represents the value "2". Thus, the array of FIG. 8B represents a value "3d2120", i.e. a decimal value "69". The first "3d" in the notation of the values indicates that the next number is a three decimal value.

The coding rule using the four color transition is not limited to the example illustrated in FIG. 8A, and may be, for example, the example illustrated in FIG. 8D. FIG. 8E shows an example of a conversion table associating color transitions and values according to the coding rule illustrated in FIG. 8D. In FIG. 8E, for example, when it is desired to express the value "2" in R as the color of the cell of a transition source, the color of the cell of a transition destination adjacent to the cell of the transition source is set to B. Similarly, when the color of the cell of the transition source is K and the value "1" is to be expressed, the color of the cell of the transition destination is G.

In step S24 following step S23 of FIG. 7, the color code image generation unit 36 assigns colors to the respective cells of the optical symbol in accordance with the color of the cell of the transition source, the value of the ternary number converted in step S23, and the conversion table of the coding rule as illustrated in FIG. 8A. The color code image generation unit 36 stores in advance the color arrangement of each cell in the cell string of the main code of the optical symbol.

Figure 9:
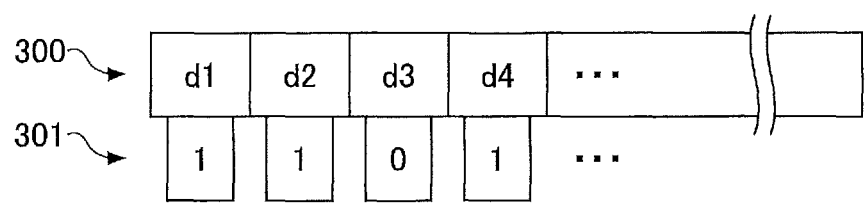
FIG. 9 illustrates an example of information for encoding into an optical symbol.
Figure 10:
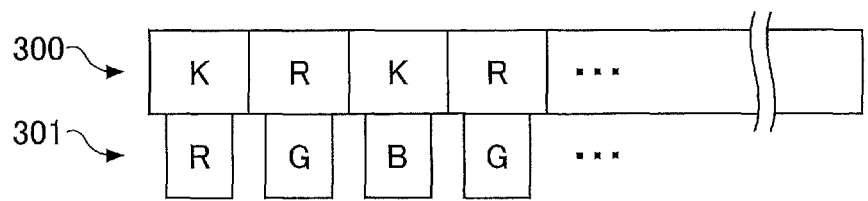
FIG. 10 is a diagram showing an example of an optical symbol when the number of colors assigned to each cell of the optical symbol is four.

A more specific example in the case where the number of colors assigned to each cell of the optical symbol is four will be described with reference to FIGS. 9 and 10. FIG. 9 is a diagram showing an example of information to be coded into the optical symbol. FIG. 10 is a diagram showing an example of the optical symbol in the case where the number of colors assigned to each cell of the optical symbol is four.

FIG. 9 is an example of the values "3d1," "3d1," "3d0," and "3d1" in each cell column of the sub-code unit 301 connected to "d1," "d2," "d3," and "d4" of the main code unit 300.

FIG. 10 shows an example of an optical symbol in which the information illustrated in FIG. 9 is coded according to the coding rule described with reference to FIGS. 8A to 8E. In this example, the cell row of the main code unit 300 includes an even number of cells, and is configured by alternately arranging K and R with the leading end cell as K.

In addition, for example, in the cell at the left end, the color of the cell is assigned to the sub-code unit 301 by using K of the cell of the main code unit 300 to which the cell is connected as the color of the first transition source. Referring to FIG. 10, R is assigned to the cell of the leftmost sub-code unit 301 of the optical symbols by referring to the translation table of the coding rules of FIG. 8A in accordance with K of the cell of the main code unit 300 which is the cell of the source of the transition and the value "3d1" of the cell of the sub-code unit 301.

In step S14 following step S13 in FIG. 6, the color-coded work instruction creation unit 38 creates a work instruction 810 for the information processing system 12 using the color code image 811 generated in step S13.

Figure 11:
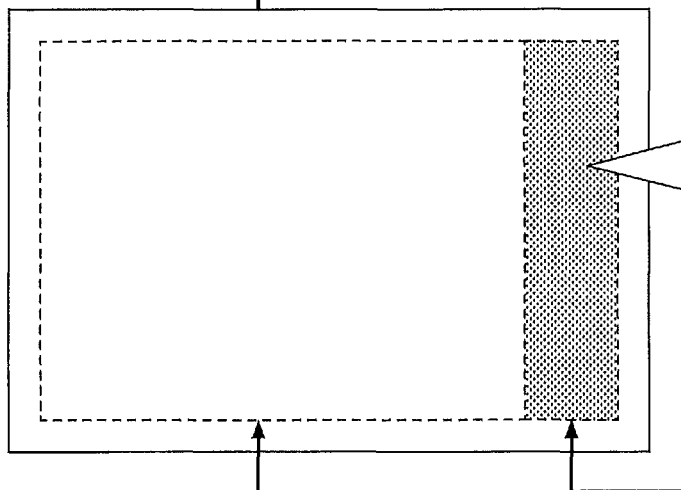
FIG. 11 is a diagram showing an image of a process for creating a work instruction with color code.

FIG. 11 is a diagram showing an image of processing for creating a work instruction with color code. The paper size and the layout frame may be set in advance by the operator. The work instruction 800 for the customer system 10 of FIG. 2A is scaled down to create a free space. The work instruction 810 for the information processing system 12 illustrated in FIG. 2B is obtained by attaching a color code image 811 to an empty space generated by scaling down the work instruction 800 for the customer system 10.

In the work instruction 800 for the customer system 10 illustrated in FIG. 2A, at least one bar code image 801 used on the customer system 10 side is displayed. Therefore, simply reducing the work instruction 800 for the customer system 10 may cause the bar code image 801 to fail.

Figure 12:
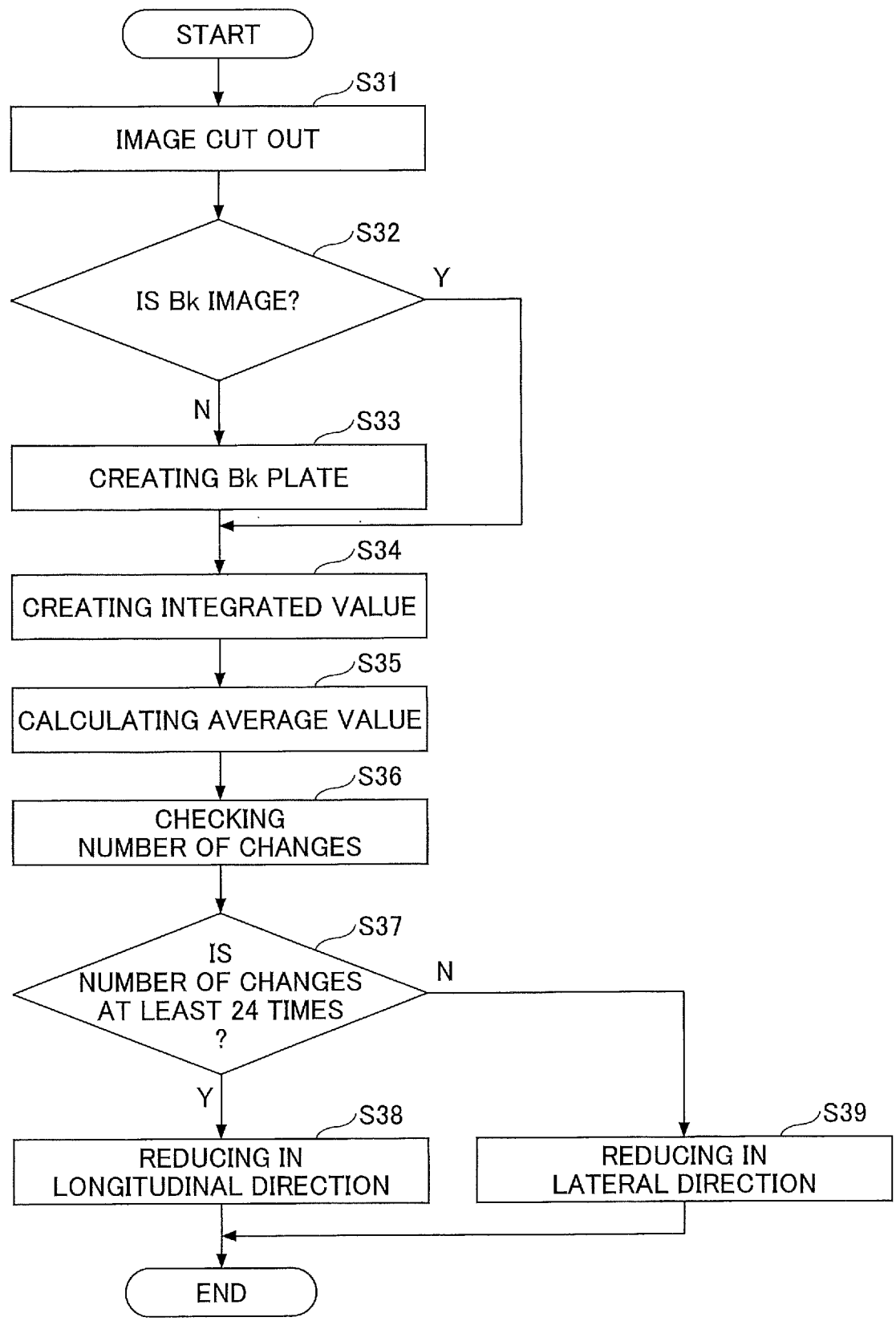
FIG. 12 is a flowchart of an example of processing for reducing an image including a bar code image.

Therefore, in order to generate an empty space without impairing the function of the bar code image 801, the color-coded work instruction creation unit 38 confirms the direction of the bar code image 801 in the procedure illustrated in FIG. 12, and performs scaling and reduction in the direction in which the function of the bar code image 801 is not impaired.

Figure 13:
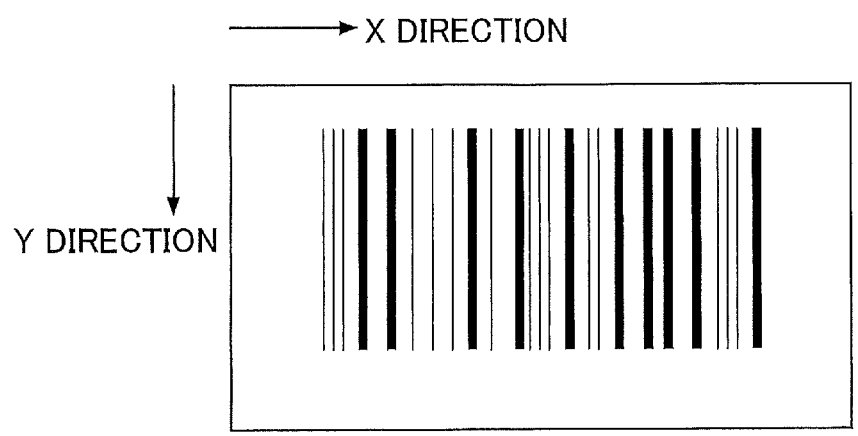
FIG. 13 illustrates an example of a bar code image.

FIG. 12 is a flowchart of an example of processing for reducing an image including a bar code image. In step S31, the color-coded work instruction creation unit 38 cuts out the position of the bar code image 801 of the work instruction 800 for the customer system 10 illustrated in FIG. 2A. In step S32, the color-coded work instruction creation unit 38 determines whether the extracted bar code image as illustrated in FIG. 13 is a Bk (monochrome) image or an RGB (RGB) image. FIG. 13 illustrates an example of a bar code image.

If the image is not a Bk (monochrome) image, the color-coded work instruction creation unit 38 proceeds to step S33, converts the RGB image into a Lab image or a Luv image, creates a monochrome image in which only the L component is extracted after the conversion, and proceeds to step S34. If the image is a monochrome image, the color-coded work instruction creation unit 38 skips step S33 and proceeds to step S34.

In step S34, the color-coded work instruction creation unit 38 raster scans all the pixels in the bar code image of FIG. 13. Here, it is assumed that the pixel position (x, y) is a position according to the X direction and the Y direction displayed in FIG. 13. The color-coded work instruction creation unit 38 integrates the values of the pixels having the same pixel position x, that is, the values of the pixels in the Y direction.

In step S35, the color-coded work instruction creation unit 38 integrates all the pixels. The color-coded work instruction creation unit 38 obtains an average value by dividing the value obtained by integrating all the pixels by the number of all the pixels.

Figure 18:
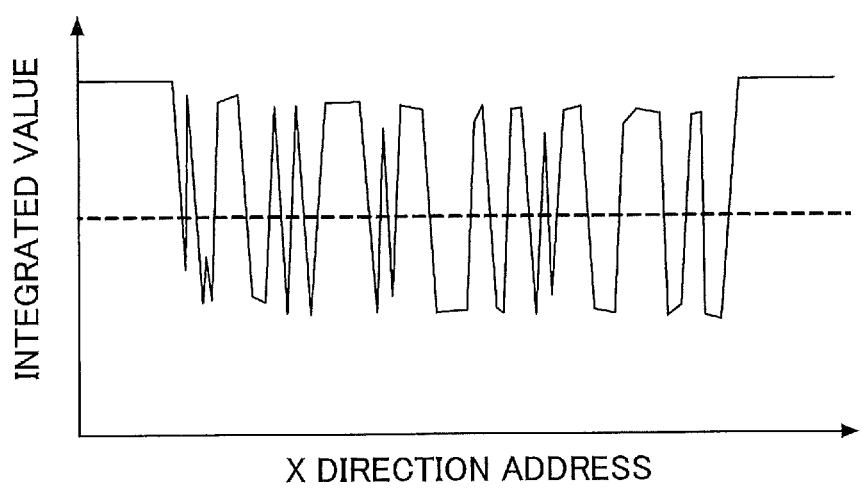
FIG. 18 is an explanatory diagram of an example of the change number confirmation process.

In step S36, as illustrated in FIG. 18, the color-coded work instruction creation unit 38 confirms the number of changes by comparing the integrated value of the pixels having the same pixel position x obtained in step S34 with the average value obtained in step S35. FIG. 18 is an explanatory diagram of an example of the number-of-changes checking process.

For example, the work instruction creation unit 38 with color code confirms the number of times of change obtained by totaling the number of times of change from the integrated value high than the average value to the integrated value lower than the average value and the number of times of change from the integrated value lower than the average value to the integrated value higher than the average value.

Figure 14:
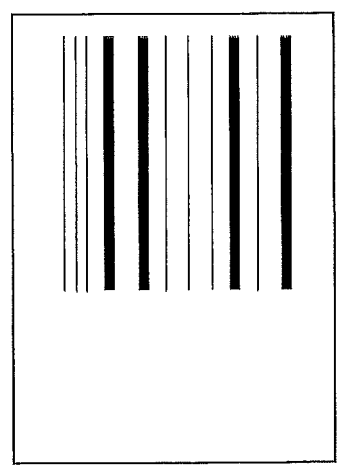
FIG. 14 illustrates an example of a bar code image before reduction in the vertical direction.
Figure 15:
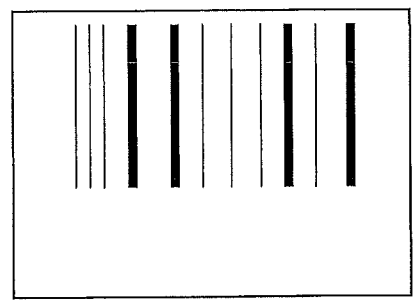
FIG. 15 illustrates an example of a bar code image after reduction in the vertical direction.

In step S37, the color-coded work instruction creation unit 38 determines whether or not the number of changes confirmed in step S36 is 24 or more. If the number of changes is 24 or more, the process advances to step S38, and the color-coded work instruction creation unit 38 performs scaling in a direction in which the bar code image of FIG. 14 is reduced in the vertical direction as in the bar code image of FIG. 15, for example. FIG. 14 illustrates an example of a bar code image before reduction in the vertical direction. FIG. 15 illustrates an example of a bar code image after being reduced in the vertical direction.

For example, when the bar code image illustrated in FIG. 13 is reduced in the X direction, black lines approach each other, and it becomes difficult to discriminate a change in black and white. On the other hand, since the interval between black lines does not change even if the bar code image illustrated in FIG. 13 is reduced in the Y direction, the discrimination of black and white is not affected.

Figure 16:
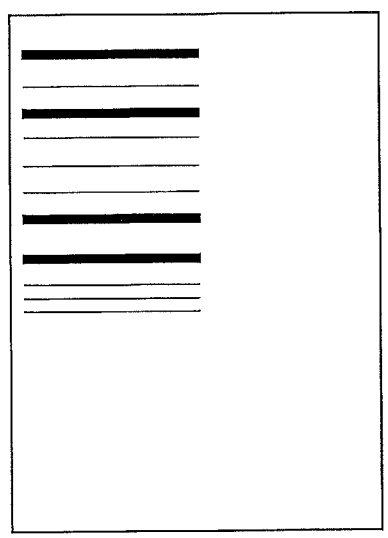
FIG. 16 illustrates an example of a bar code image before reduction in the lateral direction.
Figure 17:
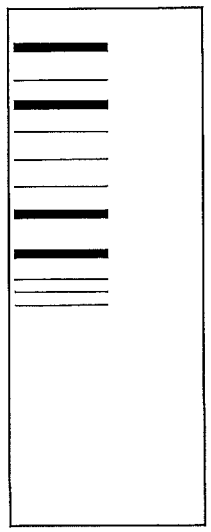
FIG. 17 illustrates an example of a bar code image after being reduced in the lateral direction.

Meanwhile, if the number of changes is not more than 24 times, the step S39 proceeds, and the work instruction creation unit 38 with a color code reduces the bar code image shown in FIG. 16 in a direction that is reduced in a lateral direction, such as the bar code image shown in FIG. 17.

The process of the flowchart of FIG. 12 determines the direction of the bar code image based on the following idea. For example, in the case of a vertical bar code as illustrated in FIG. 13, since there is the width of a black line, a change from a white line to a black line and a change from the black line to the white line occur in a set. The number of changes varies according to the number of displayed digits of the bar code, but when a typical bar code is examined, if the number of changes is 24 or more, it can be determined that the bar code is a vertical bar code as illustrated in FIG. 13.

Figure 19:
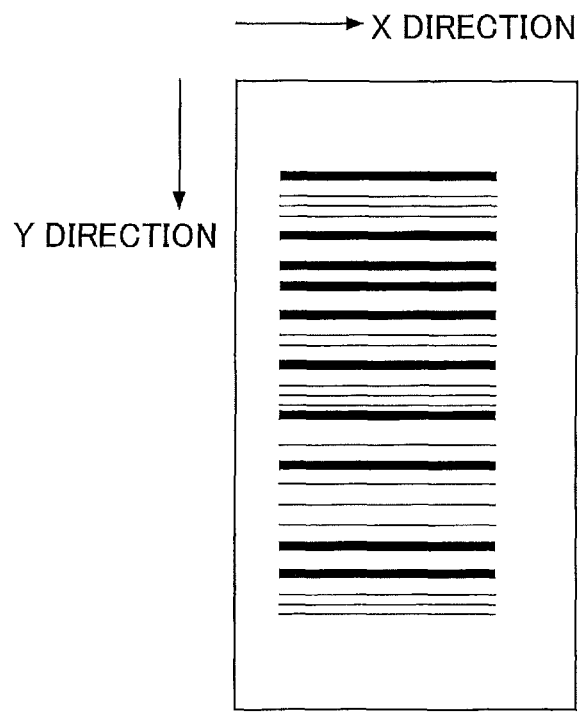
FIG. 19 illustrates an example of a bar code image.
Figure 20:
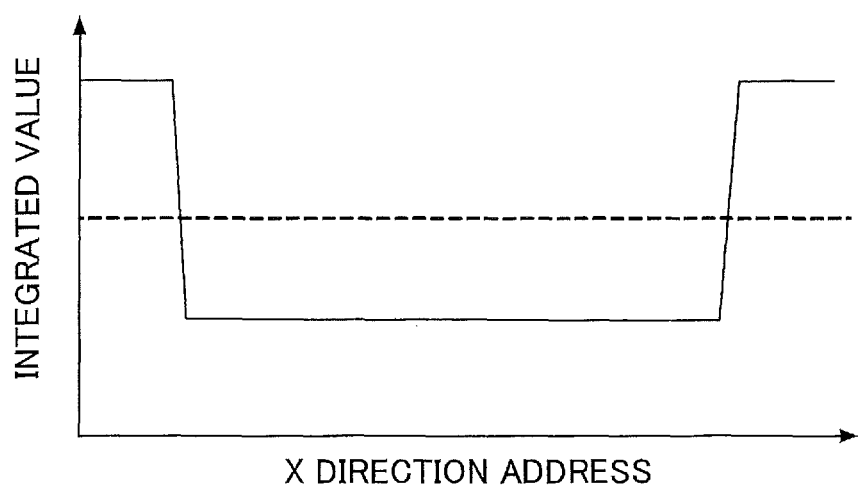
FIG. 20 explains an example of the number-of-changes checking process.

Similarly, in the case of a bar code in the horizontal direction as illustrated in FIG. 19, in step S36, the color-coded work instruction creation unit 38 confirms the number of changes as illustrated in FIG. 20. FIG. 19 illustrates an example of a bar code image. FIG. 20 explains an example of a process of checking the number of changes.

Referring to FIG. 20, because the number of times of change obtained by totaling the number of times of change from the integrated value higher than the average value to the integrated value lower than the average value and the number of times of change from the integrated value lower than the average value to the integrated value higher than the average value is extremely small, even if information other than the bar code image is integrated, the number of times of change does not become 24 or more, for example. Therefore, if the number of changes is 24 or more, it can be determined that there presents a bar code in the lateral direction as illustrated in FIG. 19.

Instead of the method of determining the direction of the bar code image described above, the direction of the bar code image can be determined by Fourier transform, Hough transform which is one of feature extraction methods, or the like. However, recent printers perform halftone processing. Especially in an electrophotographic printer, an all-wire dither may be used.

When the Hough transform is used, a line segment component in an image can be extracted. Although the line segment component of the bar code is dominant, it is difficult to eliminate the influence of halftone processing, especially the omni-line dither. In order to reduce the influence of the all-wire dither, the position of the bar code image 801 must be strictly specified in step S31. Similarly, in the case of using Fourier transform, it becomes a problem whether the influence of the halftone processing around the bar code can be strictly eliminated.

On the other hand, in the method of determining the direction of the bar code image of the present embodiment, even if the omni-directional dither image or some character or image is included in the periphery of the bar code image cut out in step S31, the number of changes is not caused to be counted so as to cause no problem.

As described above, in the work process management system 14 of the present embodiment, it is possible to create an empty space by scaling in a direction that does not impair the function of the bar code image 801, and to add the color code image 811 that can be read remotely to the empty space. Even if the work instruction 800 for the customer system 10 is scaled down, the function of the bar code image 801 is not impaired, and the function of the color code image 811 can be added to the work instruction 810 for the information processing system 12 while the function of the work instruction 800 for the customer system 10 remains.

In step S15 following step S14 in FIG. 6, the print instruction unit 40 instructs the printer 16 to print the work instruction 810 for the information processing system 12 to which the color code image 811 created in step S14 is added. The printer 16 prints a work instruction 810 for the information processing system 12 to which a color code image 811 as illustrated in FIG. 2B, for example, is added in accordance with an instruction from the print instruction unit 40.

<<Updating Job Status when Passing Gates>>

In the job management system 1 according to the present embodiment, the job status of the job management table memory unit 48 is updated as follows by photographing the work instruction 810 for the information processing system 12 to which the color code image 811 is added by the camera 18a.

Figure 21:
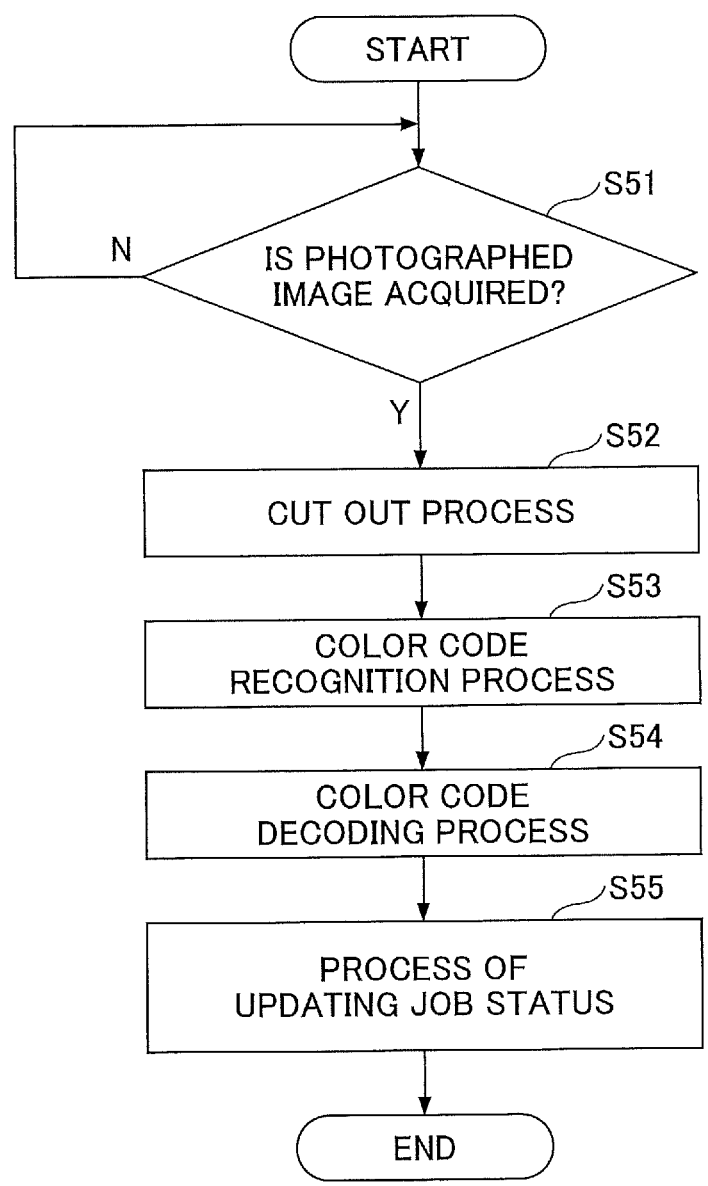
FIG. 21 is a flowchart of an example of job status update processing when passing through a gate.

FIG. 21 is a flowchart of an example of job status update processing when a gate is passed. When the photographed image acquisition unit 42 of the work process management system 14 acquires a photographed image or a photographed moving image from the camera 18a, the process proceeds to step S52.

In step S52, the color code recognition unit 44 tries to cut out the color code image 811 from the photographed image or the photographed moving image acquired by the photographed image acquisition unit 42. In step S 53, the color code recognition unit 44 performs recognition processing of the color code image 811 in the procedure described in, for example, Japanese Patent Laid-Open Patent Application No. 2017-199306.

When the color code image 811 is recognized, the color code recognition unit 44 detects an image of each cell from the color code image 811. In step S54, the color code recognition unit 44 recognizes the color information of each cell detected in step S53 and the connection information of each cell as symbol information. The color code recognition unit 44 proceeds to step S54, and decodes the symbol information according to the coding rule illustrated in FIG. 8A, for example, to restore the color code ID coded in the color code image 811.

In step S55, the color code recognition unit 44 provides, for example, identification information of the camera 18a that photographed the color code image 811 and the color code ID restored by decoding to the job management unit 34. The job management unit 34 refers to the job management table memory unit 48 and identifies the job ID corresponding to the color code ID.

Then, the job management unit 34 can update the job status managed in the job management table memory unit 48 from "undetected" to "current process" or "passed" based on, for example, the identification information of the camera 18a that photographed the color code image 811 and the job ID corresponding to the color code ID restored from the color code image 811.

<<Updating Job Status During Storage in Temporary Storage Location>>

In the job management system 1 according to the present embodiment, the job status of the job management table memory unit 48 is updated as follows by photographing the work instruction 810 for the information processing system 12 to which the color code image 811 is added by the camera 18b.

Figure 22:
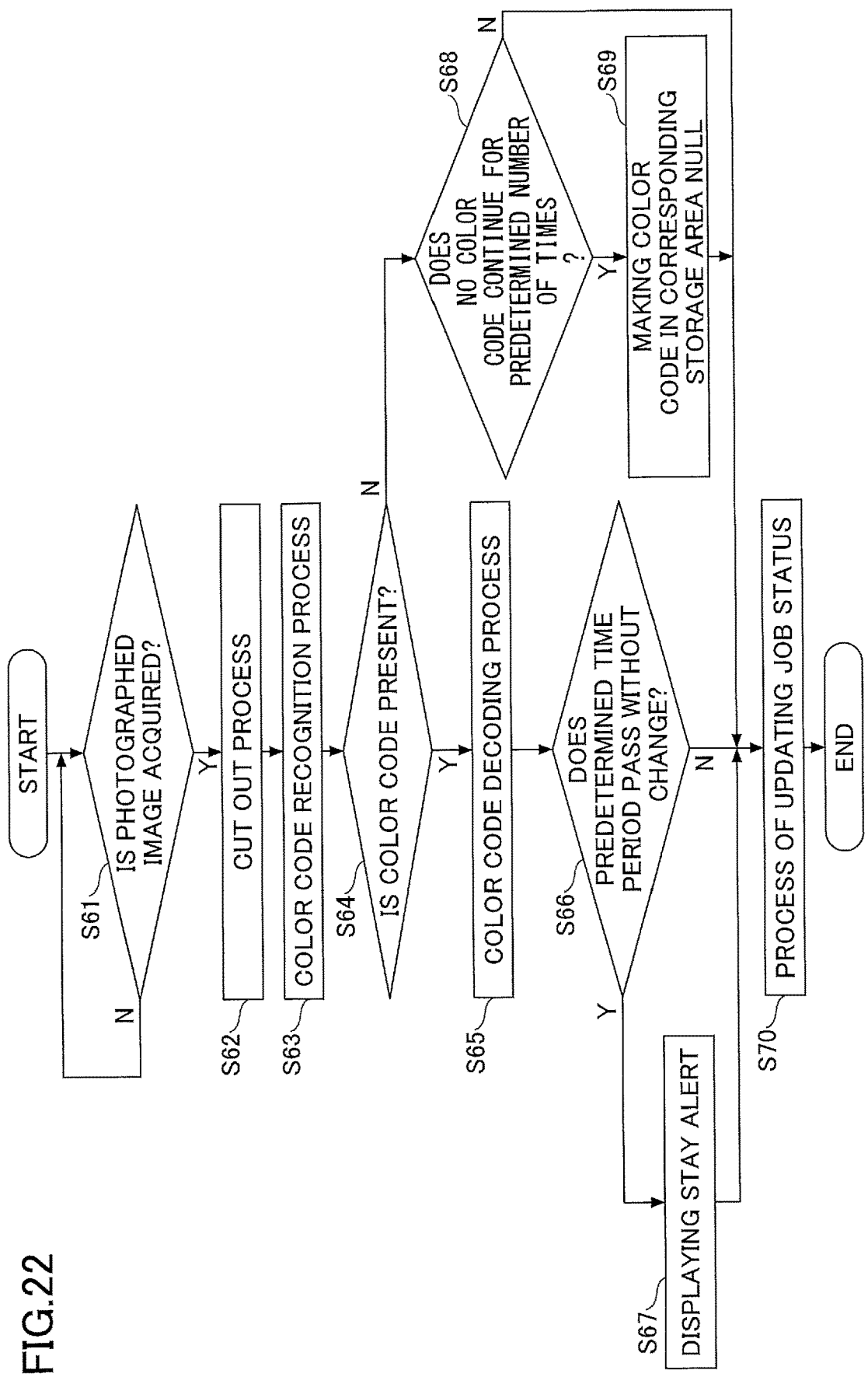
FIG. 22 is a flow chart of an example of job status update processing at the time of storage in a temporary storage location.

FIG. 22 is a flowchart of an example of job status update processing at the time of storage in a temporary storage location. When the photographed image acquisition unit 42 of the work process management system 14 acquires the photographed image from the camera 18b, the process proceeds to step S 62.

In step S62, the color code recognition unit 44 tries to cut out the color code image 811 from the photographed image or the photographed moving image acquired by the photographed image acquisition unit 42. In step S63, the color code recognition unit 44 performs recognition processing of the color code image 811 in the procedure described in, for example, Japanese Laid-Open Patent Application No. 2017-199306.

If the color code image 811 is recognized in step S63, the color code recognition unit 44 proceeds from step S64 to step S65, and decodes the symbol information recognized from the color code image 811 to restore the color code ID encoded in the color code image 811.

In step S66, the color code recognition unit 44 provides, for example, identification information of the camera 18b that photographed the color code image 811 and the color code ID restored by decoding to the job management unit 34. The job management unit 34 refers to the job management table memory unit 48 and identifies the job ID corresponding to the color code ID.

Then, the job management unit 34 determines whether a predetermined time has elapsed without a change in the job status of the job ID based on, for example, the identification information of the camera 18b that photographed the color code image 811 and the job ID corresponding to the color code ID restored from the color code image 811.

If the job status is not changed and the predetermined time has not elapsed, the job management unit 34 proceeds to step S70. In step S70, the job management unit 34 can update the job status managed by the job management table memory unit 48 from "undetected" to "current process".

If the job status is unchanged and the predetermined time has elapsed, the job management unit 34 performs the processing to display the residence alert on the job detail history screen described later, and then proceeds to the processing of step S70. In step S70, the job management unit 34 can update the job status managed by the job management table memory unit 48 from the "current process" to the "alert" or the like.

If the predetermined period of time has elapsed without any change in the job status, the job management unit 34 performs a process for displaying a stay alert on a job detail history screen, which will be described later, and then proceeds to the process of step S70. If the predetermined time has not elapsed without any change in the job status, the job management unit 34 proceeds to step S70. In step S70, the job management unit 34 can update the job status managed by the job management table memory unit 48 from "undetected" to "current process".

If the color code image 811 is not recognized in step S63, the color code recognition unit 44 proceeds from step S64 to step S68, and if the color code image 811 cannot be recognized from the photographed image from the camera 18b installed in the temporary storage location, processing is performed to update the job ID that the job status is to be stored in the temporary storage location.

The color code recognition unit 44 provides, for example, identification information of the camera 18b to the job management unit 34. The job management unit 34 determines whether or not there is a job ID for which the color code image 811 has not been recognized from the photographed image continuously for a predetermined number of times, among job IDs for which the job status of the temporary storage location corresponding to the provided identification information of the camera 18b is "current process".

If there is a job ID for which the color code image 811 has not been recognized from the photographed image consecutively for a predetermined number of times among the job IDs whose job statuses of the temporary storage locations are "current process", the job management unit 34 proceeds to step S69, sets the color code ID associated with the job ID to Null, and proceeds to step S70. In step S70, the job management unit 34 can update the job status managed by the job management table memory unit 48 from the "current process" to the "passed" or the like.

Further, there is a possibility that the work instruction 810 for the information processing system 12 is stored in a state in which it is impossible to take a picture from the camera 18b, for example, the printed matter is superimposed on the temporary storage location. In consideration of this point, the job management unit 34 skips step S69 and proceeds to step S70 if there is no job ID whose color code image 811 has not been recognized from the photographed image consecutively for a predetermined number of times among the job IDs whose job status of the temporary storage location is "current process". In step S70, the job management unit 34 can update the job status managed by the job management table memory unit 48 from the "current process" to the "stack".

According to the processing of the flowcharts of FIGS. 21 and 22, by automatically updating the job status of the printed matter to which the work instruction 810 for the information processing system 12 is attached, it is possible to track the printed matter to which the work instruction 810 for the information processing system 12 is attached.

<<Inquiry of Job>>

The operator of the job management system 1 can inquire the progress information and the history information of the work process of the job in the printing factory, the photographed image file representing the state when the work instruction 810 is photographed, the photographed moving image file, and the like through various UI screens provided by the work process management system 14.

Figure 23:
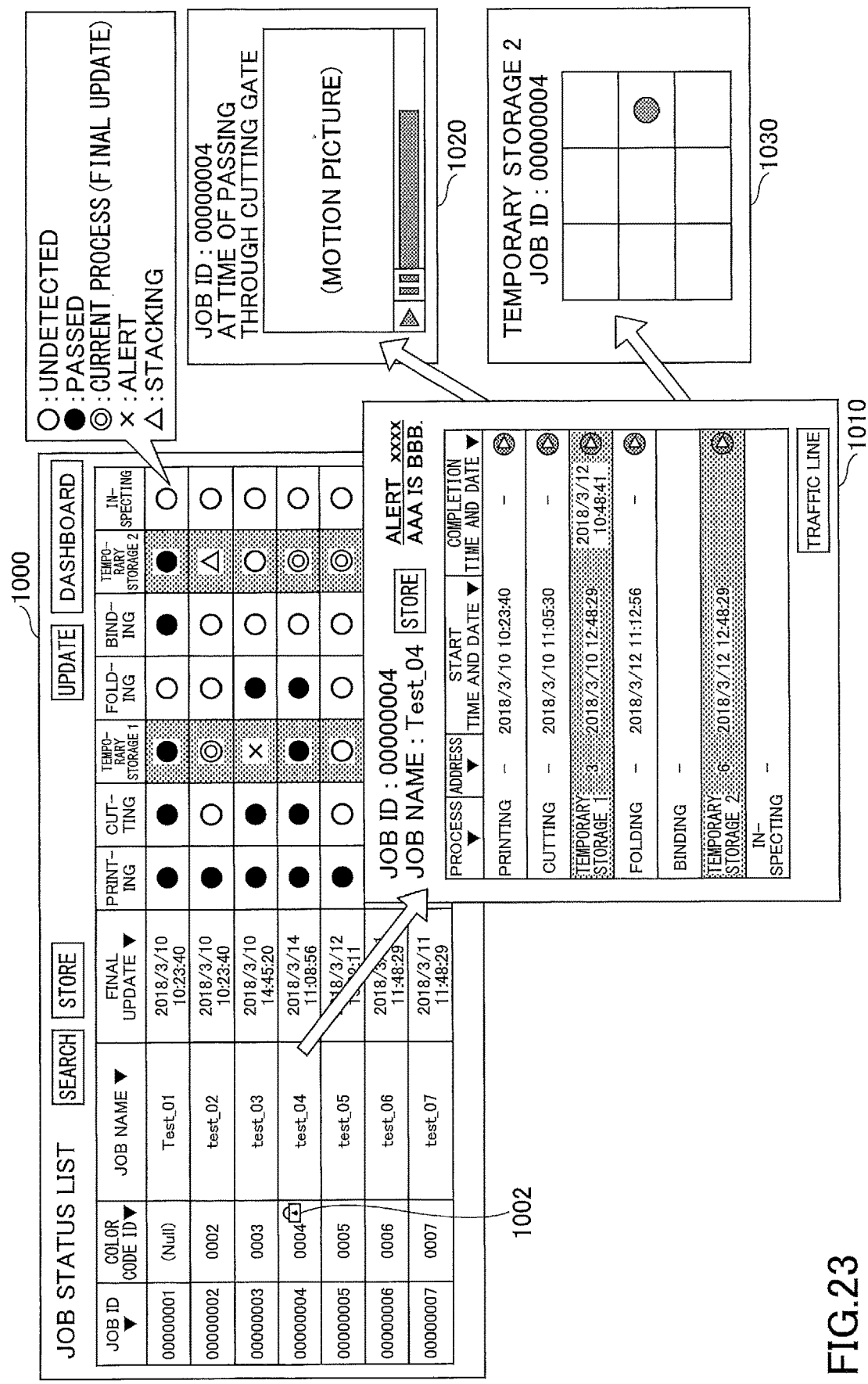
FIG. 23 is a transition diagram of an example of a UI screen displayed by the work process management system.

FIG. 23 is a transition diagram of an example of a UI screen displayed by the work process management system. The UI unit 30 of the work process management system 14 displays, for example, a job status list screen 1000 on the display device 502. The job status list screen 1000 displays a list of job information including a job ID, a color code ID, a job name, last update data, and progress information of one or more work processes.

The progress information of one or more work processes indicates whether the work process progress is "undetected", "passed", "current process", "alert" or "stacked". The progress "undetected" of the work process indicates that the work instruction 810 for the information processing system 12 is not photographed by the camera 18 corresponding to the work process. The progress "passed" of the work process indicates that the work instruction 810 for the information processing system 12 has been photographed by the camera 18 corresponding to the work process before the last update. The progress "current process" of the work process indicates that the work instruction 810 for the information processing system 12 has been photographed by the camera 18 corresponding to the work process in the final update. The progress "alert" of the work process indicates that an alert such as, for example, a stay alert has occurred. The progress "stacking" of the work process indicates that the camera 18 corresponding to the work process has taken the work instruction 810 for the information processing system 12 before the last update and that the camera 18 corresponding to the work process and other work processes has not taken the work instruction 810 for the information processing system 12 with the last update. The "stacking" of the progress of the work process indicates a condition in which it is anticipated that the printed matter to which the work instruction 810 is affixed could not be photographed with the camera 18 due to stacking or the like.

The key mark 1002 of the job status list screen 1000 indicates that the color code ID associated with, for example, a long-term storage job is locked so as not to be automatically released. In this manner, the process management system 14 provides the operator with a locking function in which the color code ID is not reused.

The operator can display the job detail history screen 1010 by selecting one job from the job status list screen 1000. The job detail history screen 1010 displays buttons for shifting to a screen for displaying a start date and time, a completion date and time, and a photographed image or a photographed moving image for each work process. When the work process is "temporary storage 1" or "temporary storage 2", an address representing a storage area in the temporary storage location is also displayed on the job detail history screen 1010. Further, the job detail history screen 1010 displays a "traffic line display" button for transitioning to the traffic line display screen 1050, which will be described later.

When a button for shifting to the screen 1020 for displaying the photographed image or the photographed moving image of the job detail history screen 1010 is pressed, the UI unit 30 shifts to the screen 1020 for displaying the photographed image or the photographed moving image. On the screen 1020 for displaying a photographed image or a photographed moving image, when the playback button is pressed, the photographed image file or the photographed moving image file representing the state of photographing the work instruction 810 is displayed.

Figure 26:
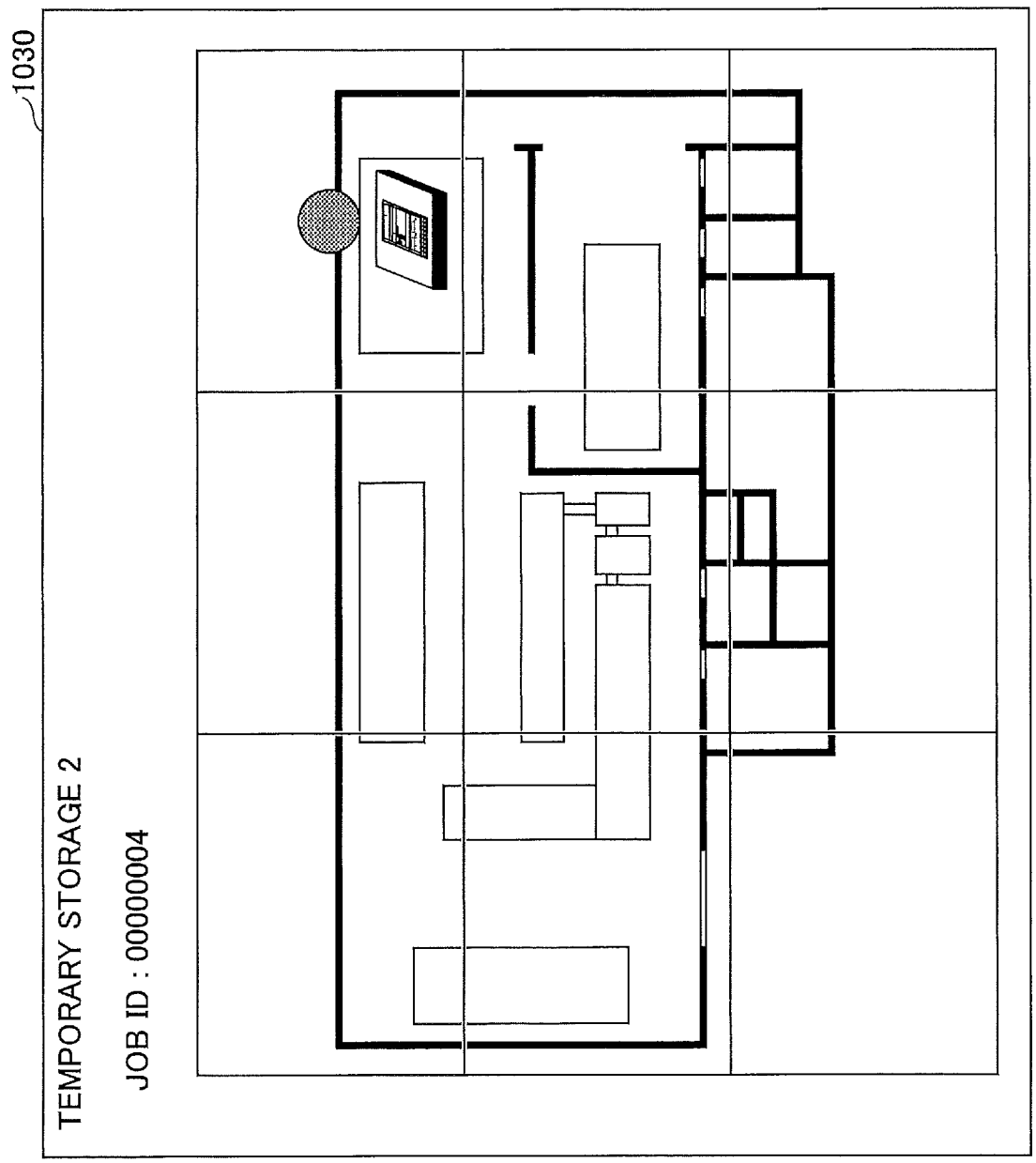
FIG. 26 illustrates an example of a map display screen of a temporary storage location.

When the button for transitioning to the map display screen 1030 for the job corresponding to the work process "temporary storage 1" or "temporary storage 2" is pressed, the UI unit 30 transitions to the map display screen 1030 illustrated in FIG. 26. FIG. 26 illustrates an example of the map display screen of the temporary storage location. The UI unit 30 displays, for example, a photographed image of a temporary storage location on the background, and displays the image so that the storage area in which the printed matter is stored can be identified by the mark "☐" or the like.

The job status list screen 1000 of FIG. 23 may be displayed by performing grouping as illustrated in FIG. 24, or may be configured to accept designation of a search condition as illustrated in FIG. 25.

FIGS. 24A to 24C are explanatory diagrams illustrating an example of a grouping process in a UI screen. FIG. 24A illustrates an example of the job status list screen 1000 before the grouping process. FIGS. 24B and 24C are examples in which progress information of one or more work processes of the job status list screen 1000 after the grouping process is grouped for each of the "first floor area" and the "second floor area" to facilitate visual grasp.

In FIG. 24C, the grouped "first floor area" is displayed in a folded manner. When the progress information of the grouped work process is displayed in a convoluted manner, the progress information and (logical conjunction/AND) of the work process included in the group are displayed as the progress information of the group so that the progress information of the work process included in the folded "1st floor area" group is understood. For example, the progress information and of the work process included in the group is determined as "alert>current process>stacked>passed>undetected".

FIGS. 25A to 25C explain examples of the search condition specifying process on the UI screen. FIGS. 25A to 25C illustrate examples of a job status list screen 1000 in which a search line is provided. The search line is displayed, for example, by pressing the "search" button on the job status list screen 1000.

The operator can search for a job that matches the search condition by specifying the search condition in the search line. The search lines provided as in FIGS. 25A-25C have the effect of improving immediacy and visibility due to the small screen transitions.

FIG. 25A illustrates an example in which a search condition is entered in the search line with a text item (partial matching). FIG. 25B illustrates an example of inputting a search condition in a time and date and time item (specified range) on the search line. FIG. 25C illustrates an example in which the search condition is selected by pull-down in the search line in the work process item (matching).

Figure 27:
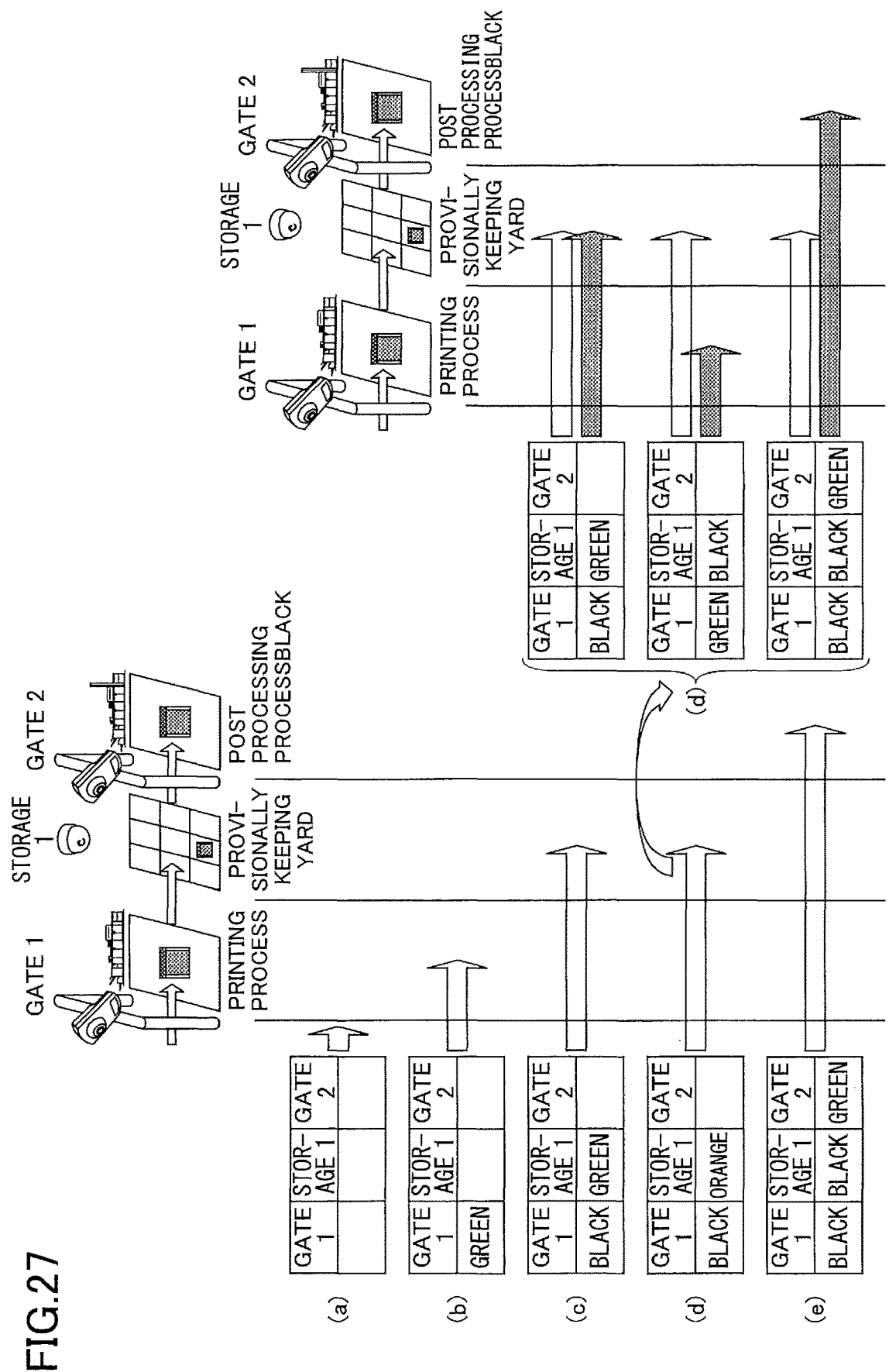
FIG. 27 explains an example in which progress information of one or more work processes is represented by a marker.

Selection by pull-down may be made, for example, to allow multiple selection by the control key. When the "condition clear" button is pressed, all search conditions are cleared and all items are displayed. In addition, the progress information of one or more work processes of the job status list screen 1000 may be represented by a marker, for example, as shown in FIG. 27. In FIG. 27, the color of the marker is represented by a kanji character. The time has elapsed in the order of (a) to (e) in FIG. 27. For example, in FIG. 27, the second work process in (c), which was the progress "current process," is the progress "accumulated" in (d). The progress information of the one or more work processes shown in (d) of FIG. 27 is again photographed by the camera 18 in a work instruction 810 for the information processing system 12, resulting in any of the conditions shown on the right side of FIG. 27.

Figure 28:
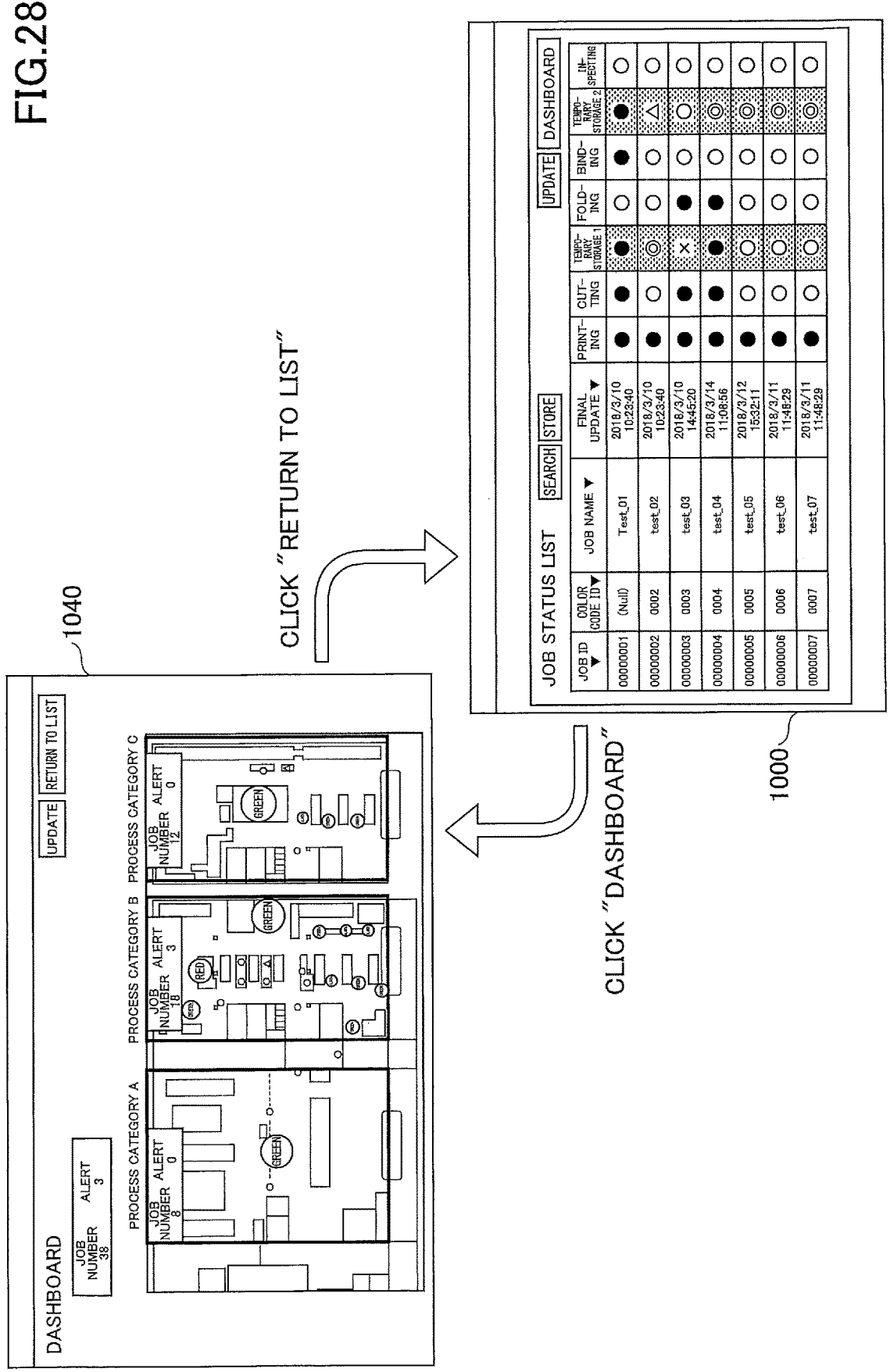
FIG. 28 explains an example of switching between a job status list screen and a dashboard display screen.
Figure 29:
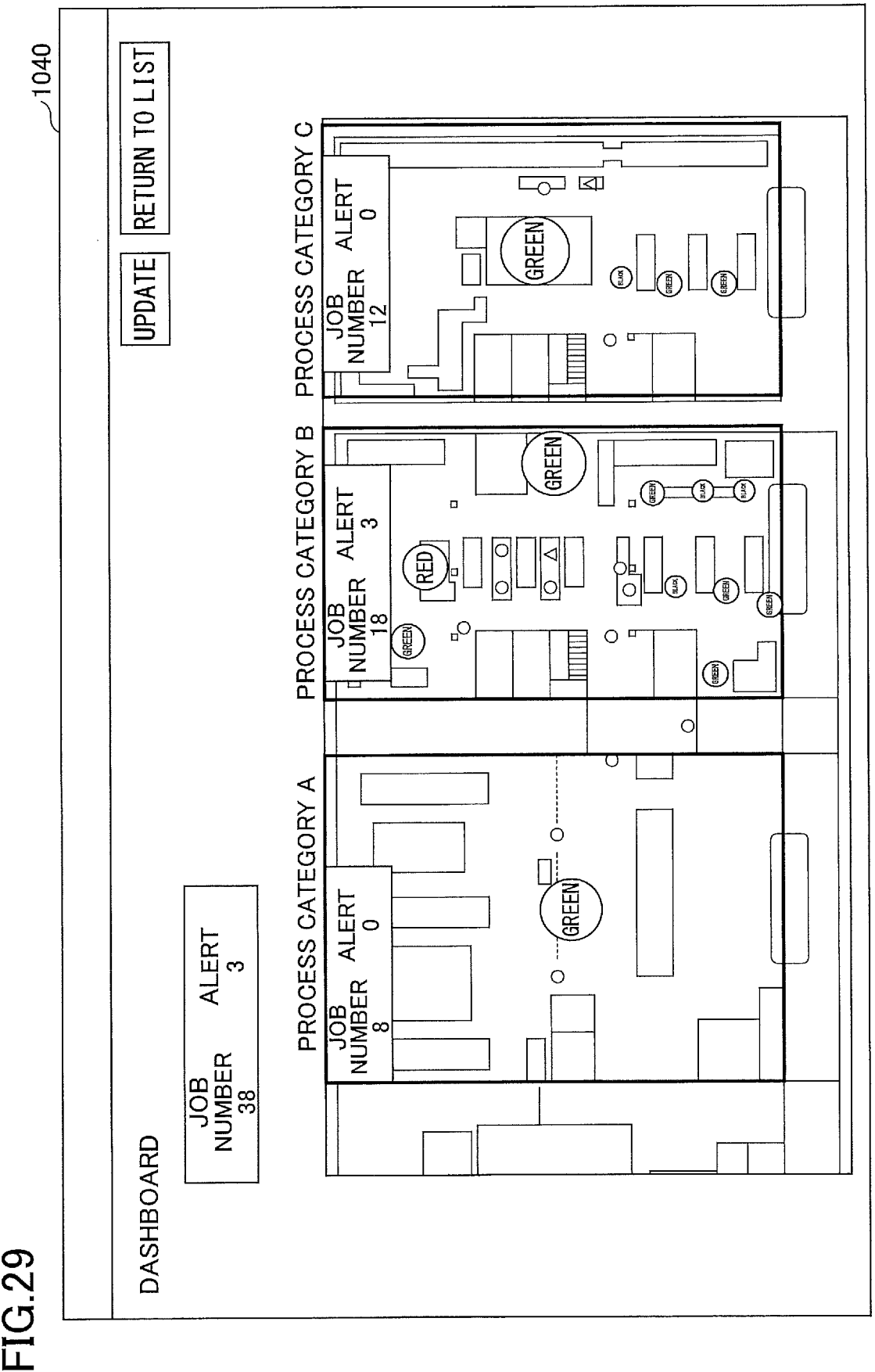
FIG. 29 illustrates an image of an example of the dashboard display screen.

The operator can also display the dashboard display screen 1040 by pressing the "dashboard" button on the job status list screen 1000. FIG. 28 is an explanatory diagram illustrating an example of a switching between a job status list screen and a dashboard display screen. When the "dashboard" button is pressed while the search condition is specified in the job status list screen 1000, the dashboard display screen 1040 takes over the search condition specification and displays it. The operator can also display the job status list screen 1000 by pressing the "return to list" button on the dashboard display screen 1040. The job status list screen 1000 may take over the original search condition specification before the transition to the dashboard display screen 1040. FIG. 29 is an image diagram illustrating an example of a dashboard display screen.

The dashboard display screen 1040 displays information about the progress of multiple jobs by a marker (an example of a display object) representing the location on the map of the job and the number of jobs per location. For example, FIG. 29 shows the number of jobs and alerts in the process category for each of "process category A", "process category B", and "process category C". The dashboard display screen 1040 of FIG. 29 may enclose the process category in a frame and embed the factory map as a background image. The position where the marker is displayed indicates one or more work processes. The size of the marker indicates the number of jobs in the process. This feature distinguishes between the colors of normal markers (e.g., green) that do not contain the job where the alert occurred and the colors of alert markers (e.g., red) that contain the job where the alert occurred.

Figure 30:
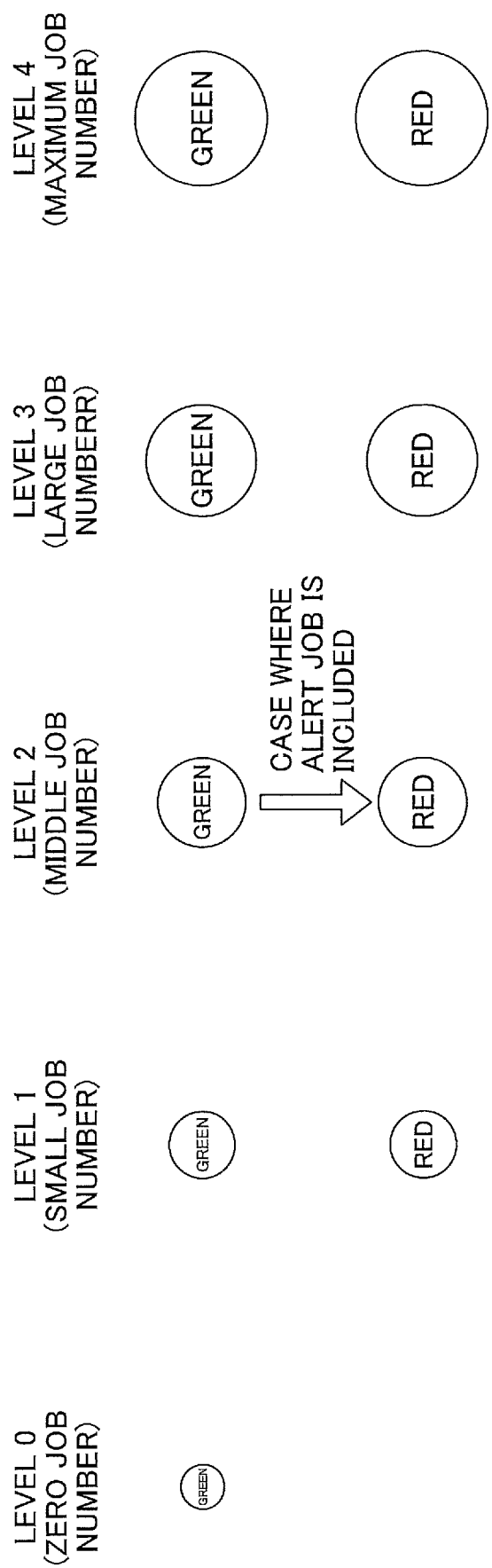
FIG. 30 explains an example of a marker.

FIG. 30 is an illustrative view of an example of a marker. The marker in FIG. 30 is an example represented by a bubble (circle mark) and is represented by a circle of five level sizes corresponding to the number of jobs for a specified work process. The parameters of the marker in FIG. 30 include a range of job numbers, a central coordinate, a radius (size) and a color (normal marker/alert marker). Normal marker colors may vary from one level to another. The dashboard display screen 1040 provides a visually understandable display of the number of jobs in each work process and the work process that includes the job where the alert is occurring. In addition, the operator can display the traffic line display screen 1050 by pressing a "traffic line" button on the job detail history screen 1010.

Figure 31:
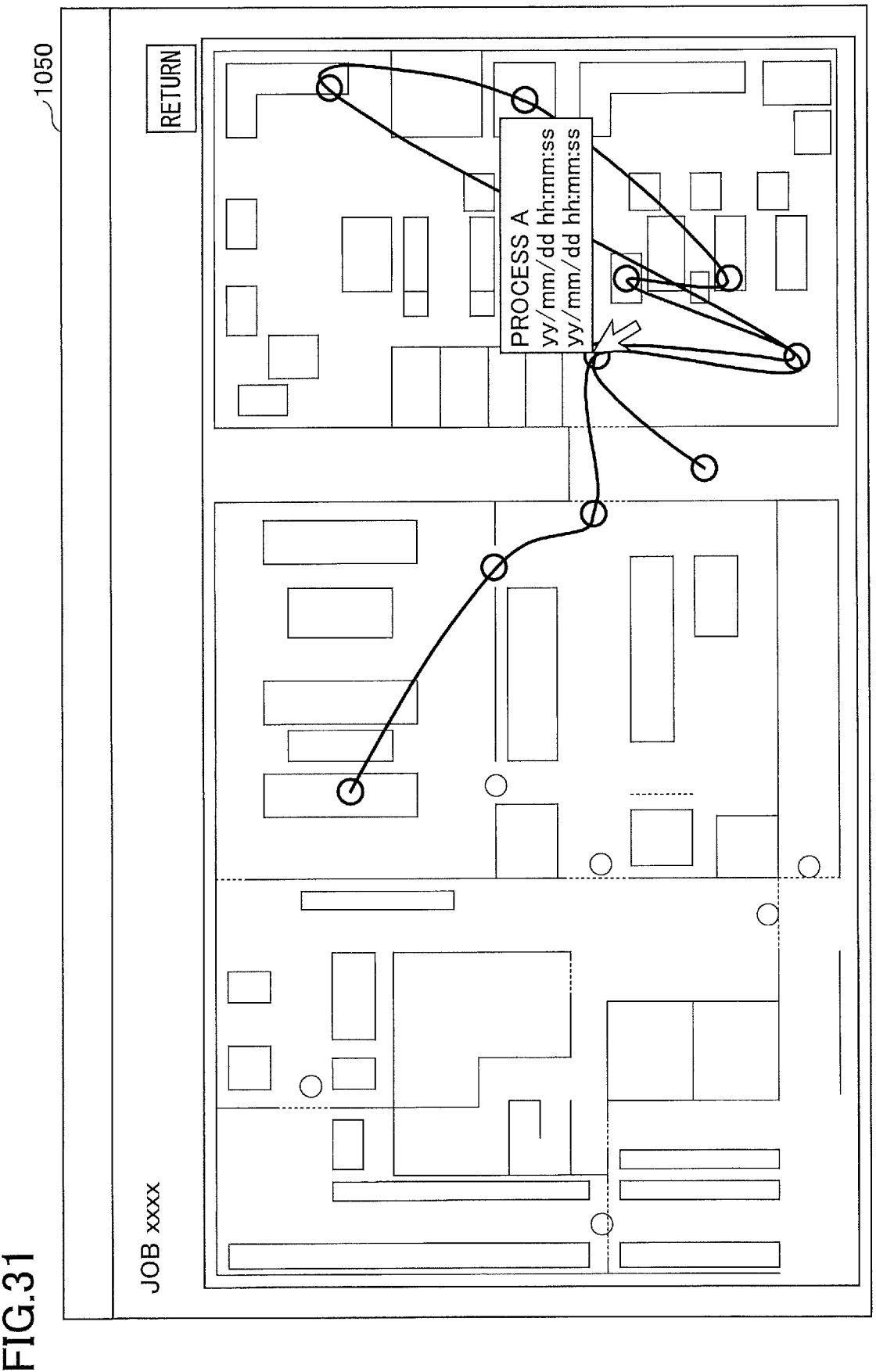
FIG. 31 illustrates an image of an example of a traffic line display screen.

FIG. 31 is an image diagram illustrating an example of a traffic line display screen. The traffic line display screen 1050 displays the traffic line by connecting the job history with a curve on the map based on the information about the job history displayed on the job detail history screen 1010. The curve is, for example, a Bezier curve. The Bezier curve is an (N−1)th order curve obtained from control points as many as N. The line display screen 1050 of FIG. 31 illustrates the points of the work process in circles. Circles are displayed by specifying the center coordinate, radius, color, and transparency. The work process that the job has not passed is hidden. In addition, in the motion display screen 1050 of FIG. 31, the center coordinate of the work process through which the job has passed is connected by a Bezier curve so that the traffic line of the job can be visually represented. In the traffic line display screen 1050 of FIG. 31, In the traffic line display screen 1050 of FIG. 31, a mouse may be brought over the circle so as to display information such as the process name/transit time (all if any) of the work process corresponding to the circle.

As described above, according to the work process management system 14 of the present embodiment, the progress information of the work process of the job in the printing factory can be checked in the list. In addition, according to the work process management system 14 of the present embodiment, it is possible to confirm the history information of the work process of the job in the printing factory, the photographed image file representing the state when the work instruction 810 is photographed, the photographed moving image file, and the like by a simple operation.

Second Embodiment

In the first embodiment, the work process management system 14 creates the work instruction 810 for the information processing system 12. In the second embodiment, the customer system 10 creates the work instruction 810 for the information processing system 12. The second embodiment is the same as the first embodiment except for a part thereof. Therefore, descriptions of the same parts as those of the first embodiment are appropriately omitted.
<System Configuration>

Figure 32:
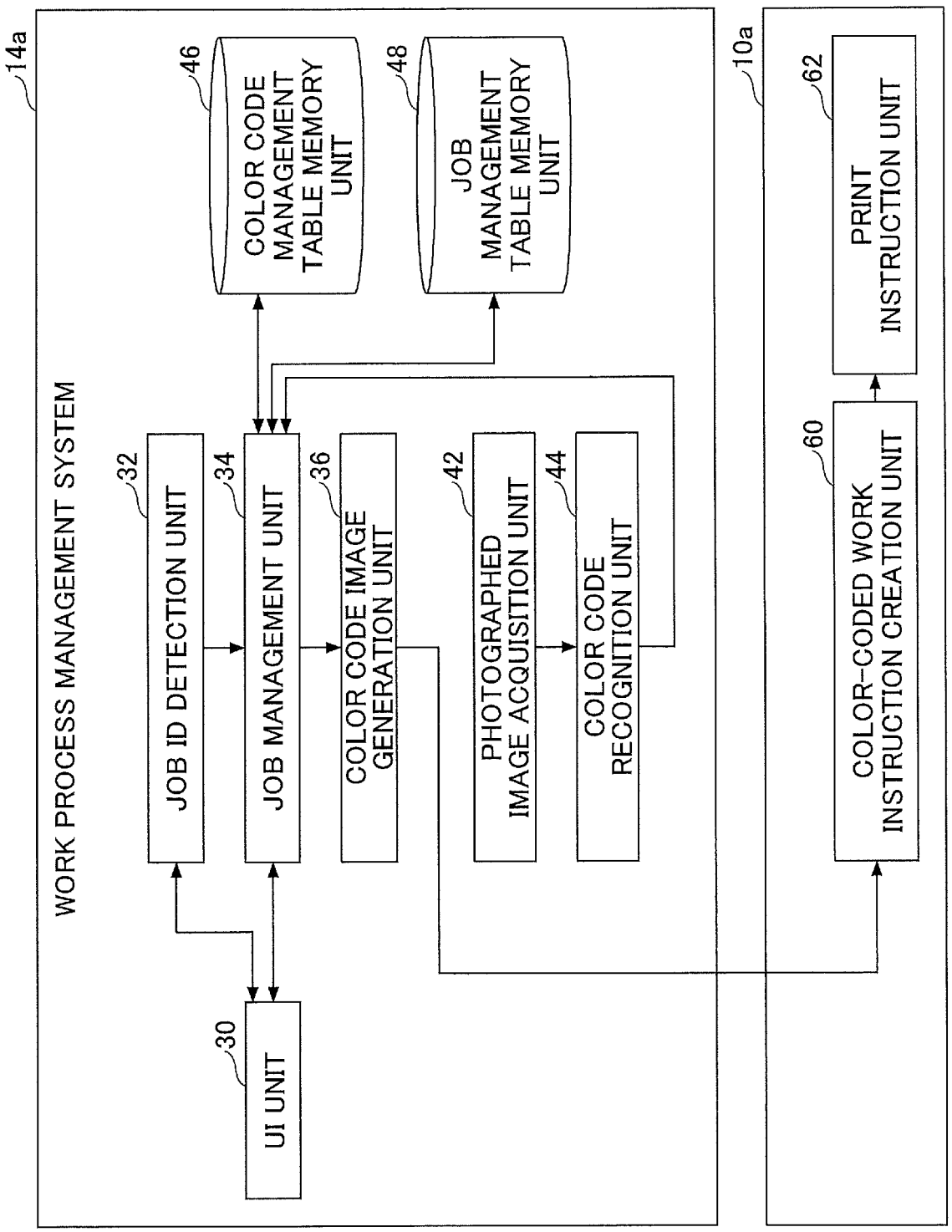
FIG. 32 is a functional block diagram of another example of the work process management system.

FIG. 32 is a functional configuration diagram of another example of the work process management system. A work process management system 14*a* illustrated in FIG. 32 is configured by excluding the color-coded work instruction creation unit 38 and the print instruction unit 40 from the work process management system 14 illustrated in FIG. 4. On the other hand, a customer system 10*a* has a color-coded work instruction creation unit 60 and a print instruction unit 62 added thereto.

In the job management system 1 according to the second embodiment, the generation of the color code image 811 is performed by a work process management system 14*a* in the same manner as in the first embodiment, and steps S14 and S15 of FIG. 6 are performed by the color-coded work instruction creation unit 60 and the print instruction unit 62 of the customer system 10.

Also in the job management system 1 according to the second embodiment, the same effect as that of the job management system 1 according to the first embodiment can be obtained.

Third Embodiment

The first and second embodiments described above are techniques realized by the work instruction 810 for the information processing system 12 in which a new code (color code image 811) is added to the work instruction 800 for the customer system 10. This technique can be applied to, for example, a technique of a conveyance system represented by an AGV (unmanned conveyance vehicle).

For example, in a conveyance system that conveys goods, the work instruction 810 for the information processing system 12 to which a color code image 811 is added is attached, and the image of an article being conveyed is photographed by the camera 18, so that the work process of the article being conveyed by the conveyance device can be managed. In addition, since the position of the conveyance device that conveys the good and the conveyance destination of the article can be specified, the conveyance system can also control the movement of the conveyance device that conveys the article.

Fourth Embodiment

Although the above-described first and second embodiments have been described with respect to the management of the work process of the job in the printing factory, the present embodiment can be applied to the management of the work process of the article flowing on the belt conveyor, for example. For example, if the technique of the present embodiment is provided for the management of the working process of the goods flowing on the belt conveyor, the tracking of the articles flowing on the belt conveyor becomes possible, and the branching of the belt conveyor can be controlled.

The present invention is not limited to the embodiments specifically disclosed above, and various modifications and variations are possible without departing from the scope of the claims. The job ID is an example of the first identification information described in the claims. The color code image is an example of the second identification information. The job ID detection unit 32 is an example of a detection unit.

The color code image generation unit 36 is an example of a generating unit. The color-coded work instruction creation unit 38 is an example of a creation unit. The job management unit 34 is an example of a management unit. The camera 18 is an example of a photographing unit. The color code recognition unit 44 is an example of a recognition unit.

The present invention is not limited to the embodiments specifically disclosed above, and various modifications and variations are possible without departing from the scope of the claims. The work instruction 800 for the customer system 10 is an example of a first slip image as claimed. The work instruction 810 for the information processing system 12 is an example of a second slip image. The bar code image 801 is an example of a code image displayed on the first slip image. The color code image 811 is an example of a new code image.

The color-coded work instruction creation unit 38 for checking the direction of the bar code image 801 illustrated in FIG. 12 is an example of a determination unit. The color-coded work instruction creation unit 38 that performs scaling and reduction in a direction that does not impair the function of the bar code image 801 illustrated in FIG. 12 is an example of a reduction unit. The color-coded work instruction creation unit 38 that creates the work instruction 810 for the information processing system 12 by using the generated color code image 811 is an example of a creating unit. The color code image generation unit 36 is an example of a generating unit.

The present invention is not limited to the embodiments specifically disclosed above, and various modifications and variations are possible without departing from the scope of the claims. The color code image 811 is an example of a code image associated with the job described in the claims. The work instruction 810 for the information processing system is an example of a slip.

The camera 18 is an example of a photographing unit. The color code recognition unit 44 is an example of a recognition unit. The job management unit 34 is an example of a management unit. The UI unit 30 is an example of providing unit. The photographed image file and the photographed moving image file are examples of photographing data. The job status list screen 1000 is an example of a list screen. The job detail history screen 1010 is an example of a detail screen.

Effect of the Invention

According to the embodiment of the present invention, a function realized by a slip can be easily added.

According to the embodiment of the present invention, the code image displayed on the first slip image can be reduced in a readable state, and a second slip image on which a new code image is displayed can be created.

According to the embodiment of the present invention, it is possible to provide an information processing system in which a user can easily confirm information on the progress of a plurality of jobs composed of a plurality of work processes.

EXPLANATION OF REFERENCE SYMBOLS

1: Job management system
10: Customer's system
12: Information processing system
14: Work process control system
16: Printer
18, 18a, 18b: cameras
20: Network
30: UI section
32: Job ID detector
34: Job Management Department
36: Color code image generator
38, 60: Color-coded Work Instruction Preparation Department
40, 62 Print Instruction Department
42: Captured image acquisition unit
44: Color code recognition unit
46: Color code management table memory unit
48: Job management table storage
800: WORK INSTRUCTIONS FOR CUSTOMER SYSTEMS
801: Bar-code image
810: Work instructions for information processing systems
811: Color code image
1000: Job status list screen
1010: Job detail history screen
1020: Screen for displaying photographed images or videos
1030: Job map screen
1040: Dashboard display screen
1050: Traffic line display screen All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention.

Although claimed embodiments of the present invention has been described in detail, it should be understood that various changes, substitutions, and alterations could be made thereto without departing from the spirit and scope of the invention.

What is claimed is:

1. An information processing system comprising:
circuitry configured to
store a status of a work process;
receive an image including a color code, sent from at least one camera;
recognize identification information from the color code included in the image;
update the status of the work process corresponding to the identification information recognized from the color code included in the image sent from a certain camera from among the at least one camera, when the identification information is recognized; and
display the updated status of the work process to a user.

2. The information processing system according to claim 1, wherein the circuitry is further configured to:
detect first identification information that includes a work process ID identifying the work process;
generate a color code image that includes second identification information, the second identification information being a color code ID associated with the first identification information; and
create a slip on which the first identification information and the second identification information are displayed.

3. The information processing system according to claim 2, wherein the circuitry is further configured to:
acquire a photographed image of the slip captured by the at least camera, the at least one camera being provided to photograph a location corresponding to the work process associated with the status of the work process.

4. The information processing system according to claim 3, wherein the circuitry is further configured to:
restore the color code ID encoded in the color code image of the photographed image of the slip; and
identify the work process ID corresponding to the color code ID, wherein the circuitry updates a work process status of the work process corresponding to the identified work process ID based on
identification information of the at least one camera that acquires the photographed image of the slip, and the color code ID included in the photographed image corresponding to the work process ID.

5. The information processing system according to claim 4,
wherein the circuitry is further configured to
generate the color code image of the second identification information, the color code image expressing a value using a transition of colors respectively of cells, which are adjacently connected.

6. The information processing system according to claim 4,
wherein the at least one camera is configured to photograph the slip, and
wherein the circuitry is further configured to
recognize the second identification information from an image of the photographed slip.

7. The information processing system according to claim 4,
wherein the circuitry is further configured to
determine a direction of the code image of an image of a first slip, on which the code image corresponding to at least one of the first identification information is displayed; and
scale down the image of the first slip in accordance with the direction of the determined code image,
wherein the circuitry creates a second slip image, on which the code image is newly displayed on an empty area formed by scaling down the image of the first slip.

8. The information processing system according to claim 7,
wherein the circuitry scales down the first slip image in a direction that does not impair a function of the code image displayed on the first slip image.

9. The information processing system according to claim 8,
wherein the circuitry scales down the first slip image in a longitudinal direction when the direction of the determined code image is in the longitudinal direction, and scales down the second slip image in a lateral direction when the direction of the determined code image is in the lateral direction.

10. The information processing system according to claim 1, wherein the circuitry is further configured to:
detect first identification information used to identify the work process;
generate second identification information associated with the first identification information; and
create a slip on which the first identification information and the second identification information are displayed, the at least one camera being configured to photograph the slip, wherein the circuitry is further configured to
recognize the second identification information from an image of the photographed slip,
manage information related to progress of the work process and photographed data of the photographed slip, based on a work process corresponding to a place where the slip is photographed by the at least one camera and the work process recognized by the circuitry, and
provide the information related to the progress of the work process whose number is plural and the photographed data of the slip photographed by the at least one camera to the user.

11. The information processing system according to claim 10,
wherein the circuitry further configured to cause a display device to display a list screen for listing the information related to the progress of a plurality of work processes and also display a detailed screen for displaying information related to a history of one of the plurality of work processes selected by the user from the list screen.

12. The information processing system according to claim 10,
wherein the circuitry further configured to cause the history of one of the plurality of work processes selected by the user from the list screen to be displayed using a traffic line on a map based on the information related to the history of the one work process selected by the user from the list screen.

13. The information processing system according to claim 12,
wherein the circuitry further configured to cause the display device to display the photographed data when the slip is photographed at a location corresponding to the work process based on the work process selected by the user on the detailed screen.

14. The information processing system according to claim 12,
wherein the circuitry further configured to display the information related to the progress of the plurality of the work processes on the list screen using a display object representing a location on the map of the plurality of the work processes and the number of the plurality of the jobs for each of the location.

15. The information processing system according to claim 10,
wherein the circuitry further configured to cause the display device to display a position of an intermediate product or a material of the work process at a temporary storage place so as to overlap a background as the photographed data when the slip is photographed when the work process is stored in the temporary storage place of the intermediate product or material of the work process.

16. The information processing system according to claim 15,
wherein, if the information related to the plurality of the work processes is stored as the intermediate product or material in the temporary storage place, the circuitry further configured to cause to display an alert after a predetermined time has elapsed without changing information about the progress of the work process.

17. The information processing system according to claim 15,
wherein, if the information related to the plurality of work processes is stored as: the intermediate product or material in the temporary storage place, the circuitry further configured to cause not to update the information related to the progress of the plurality of the work processes until a state where the code image associated with the work process cannot be recognized from the data photographed by the at least one camera for photographing the temporary storage place continuously occurs for a predetermined number of times after the code image associated with the work process cannot be recognized from the data photographed by the at least one camera for photographing the temporary storage place.

18. The information processing system according to claim 1, wherein the certain camera is arranged to capture a location where a printed matter including the color code is placed.

19. The information processing system according to claim 18, wherein the printed matter includes the color code and a bar code corresponding to the color code, and wherein the circuitry configured to perform the updating based on the identification information recognized from the color code.

20. The information processing system according to claim 1, wherein the color code includes the identification information expressed by using a plurality of color cells.

21. The information processing system according to claim 20, wherein the plurality of color cells is adjacently connected to express the identification information.

22. The information processing system according to claim 1, wherein the work process includes a process of storage in a temporary storage place.

23. The information processing system according to claim 1, wherein the status of the work process includes a status in which a job is stored in a temporary storage place and a status in which the job is left from the temporary storage place.

24. The information processing system according to claim 1, wherein the at least one camera is provided to capture a location corresponding to the work process.

25. An information processing method comprising:
   storing a status of a work process;
   receive an image including a color code, sent from at least one camera;
   recognizing identification information from the color code included in the image;
   updating the status of the work process corresponding to the identification information recognized from the color code included in the image sent from a certain camera from among the at least one camera, when the identification information is recognized; and
   displaying the updated status of the work process to a user.

26. An information processing apparatus comprising:
   circuitry configured to
   store a status of a work process;
   receive an image including a color code, sent from at least one camera;
   recognize identification information from the color code included in the image;
   update the status of the work process corresponding to the identification information recognized from the color code included in the image sent from a certain camera from among the at least one camera, when the identification information is recognized; and
   display the updated status of the work process to a user.

27. A non-transitory computer-readable recording medium saving programs of causing a computer to implement the information processing method according to claim 25.

* * * * *